United States Patent
Na

(10) Patent No.: US 9,208,823 B2
(45) Date of Patent: Dec. 8, 2015

(54) SYSTEM AND METHOD FOR MANAGING ADDRESS MAPPING INFORMATION DUE TO ABNORMAL POWER EVENTS

(75) Inventor: Se Wook Na, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 292 days.

(21) Appl. No.: 13/459,042

(22) Filed: Apr. 27, 2012

(65) Prior Publication Data

US 2013/0031296 A1 Jan. 31, 2013

(30) Foreign Application Priority Data

Apr. 27, 2011 (KR) .................... 10-2011-0039715

(51) Int. Cl.
| | |
|---|---|
| G06F 12/00 | (2006.01) |
| G06F 13/00 | (2006.01) |
| G06F 13/28 | (2006.01) |
| G11B 27/32 | (2006.01) |
| G11B 20/12 | (2006.01) |
| G11B 27/36 | (2006.01) |
| G11B 20/18 | (2006.01) |

(52) U.S. Cl.
CPC .......... *G11B 27/322* (2013.01); *G11B 20/1217* (2013.01); *G11B 27/36* (2013.01); *G11B 2020/1292* (2013.01); *G11B 2020/1836* (2013.01); *G11B 2020/1893* (2013.01); *G11B 2220/2508* (2013.01); *G11B 2220/2516* (2013.01); *G11B 2220/65* (2013.01)

(58) Field of Classification Search
CPC ........... G11B 5/012; G11B 2220/2516; G11B 2220/2508; G06F 12/02; G06F 1/3206
USPC .................................. 711/103, 112, 170, 202
See application file for complete search history.

(56) References Cited

U.S. PATENT DOCUMENTS

| | | | |
|---|---|---|---|
| 7,440,221 | B2 | 10/2008 | Tsuchinaga |
| 7,982,994 | B1 | 7/2011 | Erden |
| 8,179,627 | B2 | 5/2012 | Chang |
| 8,194,340 | B1 * | 6/2012 | Boyle et al. ..................... 360/48 |
| 8,270,256 | B1 | 9/2012 | Juang |
| 8,443,167 | B1 * | 5/2013 | Fallone et al. ................ 711/206 |
| 2004/0148679 | A1 * | 8/2004 | Garneau ............................ 2/159 |
| 2004/0178679 | A1 * | 9/2004 | Kabasawa ................... 307/10.1 |
| 2006/0129757 | A1 * | 6/2006 | Scherzer ....................... 711/113 |

(Continued)

OTHER PUBLICATIONS

Garth Gibson, Directions for Shingled-Write and Two-Dimensional Magnetic Recording System Architectures: Synergies with Solid-State Disks, Carnegie Mellon University, May 2009,pp. 1-2, Pittsburgh, US.

*Primary Examiner* — Charles Rones
*Assistant Examiner* — Sidney Li
(74) *Attorney, Agent, or Firm* — Cesari & Reed LLP; Kirk A. Cesari; Christian W. Best

(57) ABSTRACT

A method and apparatus for managing address map information are disclosed. In one embodiment, an apparatus may comprise a processor configured to store address map changes to a first data storage medium, save the address map changes to a nonvolatile data storage medium when an abnormal power state is detected, and when the power state is no longer abnormal retrieve the last saved address map information and address map changes and update the address map information using the address map changes. The apparatus may be configured to retrieve the instructions for the processor operation over a network connection.

22 Claims, 30 Drawing Sheets

(56) References Cited

U.S. PATENT DOCUMENTS

| | | |
|---|---|---|
| 2007/0030588 A1 | 2/2007 | Tsuchinaga |
| 2009/0031099 A1* | 1/2009 | Sartore ............... 711/162 |
| 2009/0327589 A1* | 12/2009 | Moshayedi ........... 711/103 |
| 2010/0302664 A1* | 12/2010 | Heo et al. ............. 360/31 |
| 2011/0085266 A1 | 4/2011 | Kanai |
| 2011/0197035 A1* | 8/2011 | Na et al. ............... 711/154 |
| 2011/0222186 A1 | 9/2011 | Itakura |
| 2011/0292545 A1 | 12/2011 | Katada |
| 2012/0060073 A1 | 3/2012 | Itakura |
| 2012/0069466 A1 | 3/2012 | Okamoto |
| 2012/0082019 A1 | 4/2012 | Harigae |
| 2012/0099216 A1 | 4/2012 | Grobis |
| 2012/0162808 A1 | 6/2012 | Masuda |
| 2012/0194937 A1 | 8/2012 | Tagami |

\* cited by examiner

| LBA NO | VB NO | LA VA |
|---|---|---|
| 0 | 2 | 199 |
| | 0 | A |
| 1 | | |
| 2 | 3 | B |
| 3 | 7 | 199 |
| | 1 | C |
| ⋮ | ⋮ | ⋮ |
| K-1 | | |
| K | K | 199 |
| | Q | D |

FIG. 25

| LB NO | VA |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 86 |
| 11 | 87 |
| 12 | 88 |
| 13 | 89 |
| 14 | 90 |
| 15 | 91 |
| 16 | 92 |
| 17 | 93 |
| 18 | 94 |
| 20 | 15 |
| 21 | 16 |
| 50 | 38 |
| 51 | 39 |
| ⋮ | ⋮ |
| 59 | 47 |

VB_0

| LBA NO | VB NO | LA VA |
|---|---|---|
| 0 | 0 | 199 |
| 1 | | |
| 2 | | |
| 3 | 1 | 199 |
|   | 3 | 101 |
| ... | ... | ... |
| K-1 | | |
| K | 2 | 199 |
|   | 4 | 145 |

FIG. 29

| LB NO | VB NO | LA VA |
|---|---|---|
| 0 | 5 | 13 |
| 2 | 6 | 8 |
| 3 | 3 | 106 |

FIG. 30

| LBA NO | VB NO | LA VA |
|---|---|---|
| 0 | 0 | 199 |
|   | 5 | 13 |
| 1 |   |   |
| 2 | 6 | 8 |
| 3 | 1 | 199 |
|   | 3 | 106 |
| ⋮ | ⋮ | ⋮ |
| K-1 |   |   |
| K | 2 | 199 |
|   | 4 | 145 |

FIG. 31

Start VA 0 ──▶

| 3100 | 3101 | 3102 | 3103 | 3104 | 3105 | 3106 | 3107 | 3108 | 3109 | 3120 | 3121 | 3150 | 3151 | 3152 | 3153 | 3154 | 3155 | 3156 | 3157 |
|------|------|------|------|------|------|------|------|------|------|------|------|------|------|------|------|------|------|------|------|
| 3158 | 3159 | 3160 | 3161 | 3162 | 3163 | 3164 | 3165 | 3166 | 3167 | 3168 | 3169 | 3170 | 3171 | 3172 | 3173 | 3174 | 3175 | 3176 | 3177 |
| 3178 | 3179 | 3180 | 3181 | 3182 | 3183 | 3184 | 3185 | 3186 | 3187 | 3188 | 3189 | 3190 | 3191 | 3192 | 3193 | 3194 | 3195 | 3196 | 3197 |
| 3198 | 3199 | 3200 | 3201 | 3202 | 3203 | 3204 | 3205 | 3206 | 3207 | 3208 | 3209 | 3210 | 3410 | 3411 | 3412 | 3413 | 3414 | 3415 | 3416 |
| 3417 | 3418 | 3419 | 3420 | 3421 | 3422 | 3423 | 3424 | 3425 | 3426 | 3427 | 3428 | 3429 | 3001 | 3002 | 3003 | 3004 | 3005 | 3006 | 3007 |
| 3008 | 3009 |      |      |      |      |      |      |      |      |      |      |      |      |      |      |      |      |      |      |
|      |      |      |      |      |      |      |      |      |      |      |      |      |      |      |      |      |      |      |      |
|      |      |      |      |      |      |      |      |      |      |      |      |      |      |      |      |      |      |      |      |
|      |      |      |      |      |      |      |      |      |      |      |      |      |      |      |      |      |      |      |      |
|      |      |      |      |      |      |      |      |      |      |      |      |      |      |      |      |      |      |      |      |

VB_3

End VA 199

FIG. 36

| LBA | SCN | VA |
|-----|-----|-----|
| 3001 | 9 | 93 |
| 3100 | 10 | 9 |
| 3120 | 2 | 10 |
| 3150 | 60 | 12 |
| 3410 | 20 | 73 |

Start VA 0 → ... VB_3

| 3100 | 3101 | 3102 | 3103 | 3104 | 3105 | 3106 | 3107 | 3108 | 3109 | 3120 | 3121 | 3150 | 3151 | 3152 | 3153 | 3154 | 3155 | 3156 | 3157 |
|------|------|------|------|------|------|------|------|------|------|------|------|------|------|------|------|------|------|------|------|
| 3158 | 3159 | 3160 | 3161 | 3162 | 3163 | 3164 | 3165 | 3166 | 3167 | 3168 | 3169 | 3170 | 3171 | 3172 | 3173 | 3174 | 3175 | 3176 | 3177 |
| 3178 | 3179 | 3180 | 3181 | 3182 | 3183 | 3184 | 3185 | 3186 | 3187 | 3188 | 3189 | 3190 | 3191 | 3192 | 3193 | 3194 | 3195 | 3196 | 3197 |
| 3198 | 3199 | 3200 | 3201 | 3202 | 3203 | 3204 | 3205 | 3206 | 3207 | 3208 | 3209 | 3210 | 3410 | 3411 | 3412 | 3413 | 3414 | 3415 | 3416 |
| 3417 | 3418 | 3419 | 3420 | 3421 | 3422 | 3423 | 3424 | 3425 | 3426 | 3427 | 3428 | 3429 | 3001 | 3002 | 3003 | 3004 | 3005 | 3006 | 3007 |
| 3008 | 3009 | 3511 | 3512 | 3513 | 3514 | 3515 |      |      |      |      |      |      |      |      |      |      |      |      |      |

End VA 199

| LBA  | SCN | VA  |
|------|-----|-----|
| 3001 | 9   | 93  |
| 3100 | 10  | 9   |
| 3120 | 2   | 10  |
| 3150 | 60  | 12  |
| 3410 | 20  | 73  |
| 3511 | 5   | 102 |

SYSTEM AND METHOD FOR MANAGING ADDRESS MAPPING INFORMATION DUE TO ABNORMAL POWER EVENTS

CROSS-REFERENCE TO RELATED APPLICATION

This application claims priority under 35 U.S.C. §119(a) of Korean Patent Application No. 2011-0039715, filed on Apr. 27, 2011, the entire disclosure of which is hereby incorporated by reference.

BACKGROUND OF THE INVENTION

1. Field of the Invention

The present invention relates to a method and apparatus for accessing a storage medium and, more particularly, to a method and apparatus for managing address map information.

2. Description of the Related Art

A disk drive, one of storage devices, writes data to a storage medium or reads data from the storage medium according to a command issued from a host device, to thus contribute to a computer system operation. In order to enhance a record density of a disk drive, various write methods have been studied. Also, a novel method for managing address map information with respect to a storage medium appropriate for a new write method for enhancing a record density is required.

SUMMARY OF THE INVENTION

In an embodiment, an apparatus may comprise a first data storage medium a second data storage medium comprising a nonvolatile memory device, a processor configured to: store address map change data to the first data storage medium, the address map change data including map changes since address map information was last saved in a nonvolatile memory; save the address map change data to the second data storage medium when an abnormal power state is detected; and when the power state is no longer abnormal: retrieve the address map information that was last saved; retrieve the address map change data from the second data storage medium; and update the address map information using the address map change data.

In another embodiment, an apparatus may comprise a computer-readable storage medium storing instructions that when executed by a computer cause the computer to perform the method comprising: monitoring for abnormal power events in a data storage device, storing changes to address mapping to a first nonvolatile memory device when an abnormal power event is detected, and updating previously stored address mapping information based on the changes to address mapping stored in the first nonvolatile memory device when normal power is restored to the data storage device.

In another embodiment, a method may comprise monitoring for abnormal power off in a data storage device, storing address map changes to a nonvolatile memory device when an abnormal power off is detected, and updating a first instance of an address map saved in the nonvolatile memory device based on the address map changes stored in the nonvolatile memory device when power is applied to the storage device.

BRIEF DESCRIPTION OF THE DRAWINGS

FIG. 25 is a view showing an example of address map information indicating an allocation state of a virtual band with respect to a logical band illustrated in FIG. 10.

FIG. 29 is a view showing address map information with respect to a configuration of a logical band and a virtual band illustrated in FIG. 28A.

FIG. 30 is a view showing an example of address map change information generated in case of changing to an allocation state of a virtual band with respect to the logical band as shown in FIG. 28B according to performing a write command.

FIG. 31 is a view showing address map information with respect to a configuration of the logical band and the virtual band illustrated in FIG. 28B.

FIG. 36 is a view showing a mapping relationship of VAs with respect to LBAs in virtual band number 3 illustrated in FIG. 28A.

FIG. 37 is a view showing address map information with respect to virtual band number 3 illustrated in FIG. 36.

FIG. 38 is a view showing a mapping relationship of VAs with respect to LBAs including LBAs read from virtual addresses 102 to 106 of virtual band number 3 to update address map information based on the address map change information illustrated in FIG. 30.

FIG. 39 is a view showing address map information with respect to virtual band number 3 illustrated in FIG. 38.

DETAILED DESCRIPTION OF THE INVENTION

Figure 1:
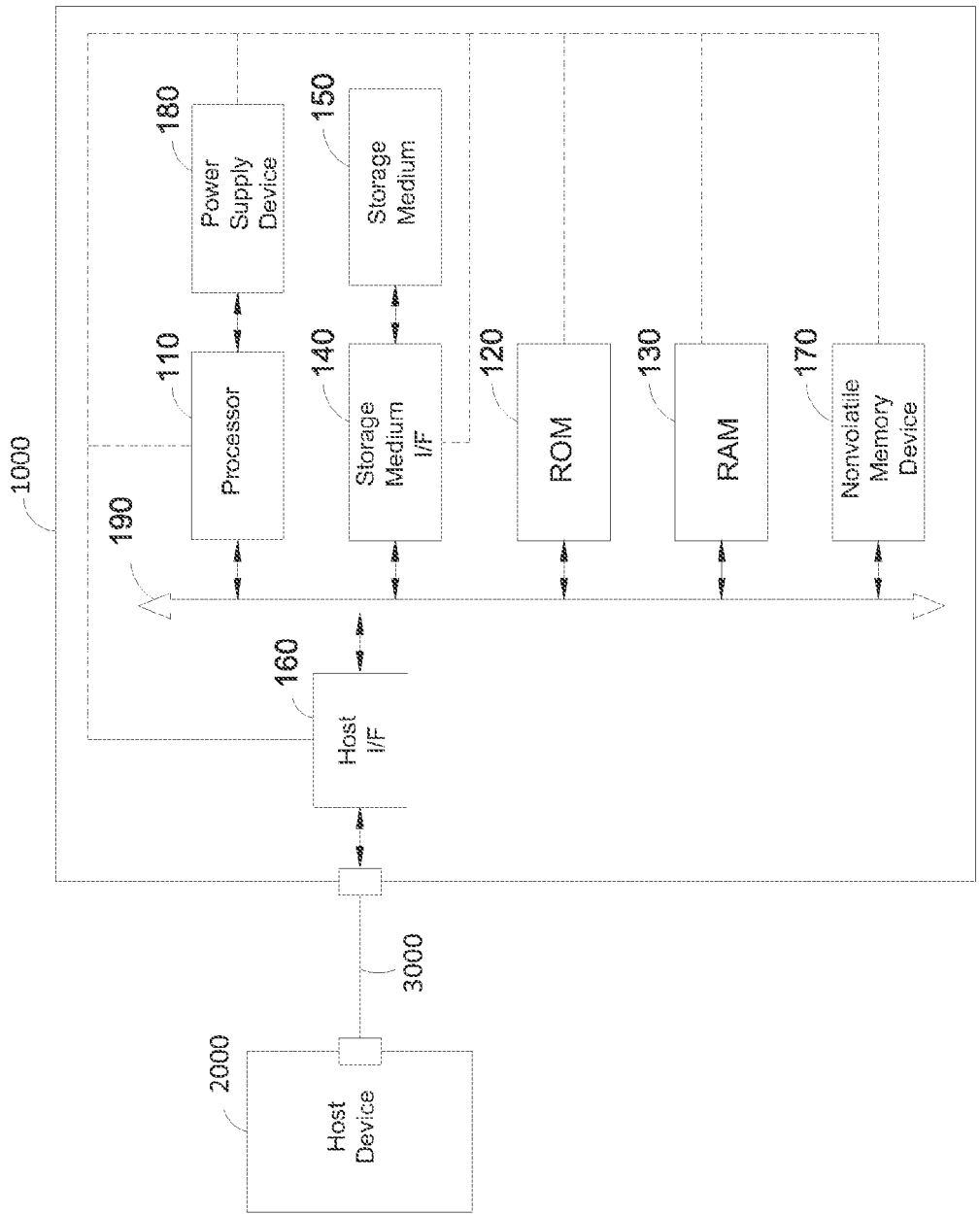
FIG. 1 is a view showing a computer system according to an embodiment of a technical concept of the present invention.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to those skilled in the art. Throughout the attached drawings, like reference numerals denote like elements.

Hereinafter, an exemplary embodiment of the present invention will be described in detail with reference to the accompanying drawings.

As shown in FIG. 1, a computer system according to an embodiment of the inventive concept includes a storage device 1000, a host device 2000, and a connector 3000.

In detail, the storage device 1000 includes a processor 110, a ROM 120, a RAM 130, a storage medium interface (storage medium I/F) 140, a storage medium 150, a host interface (host I/F) 160, a nonvolatile memory device 170, a power supply device 180, and a bus 190.

The host device 2000 performs a process of issuing a command for operating the storage device 1000, transmitting the issued command to the storage device 1000 connected via the connector 3000, and transmitting or receiving data to or from the storage device 1000 according to the issued command.

The connector 3000 is a means for electrically connecting an interface port of the host device 2000 and an interface port of the storage device 1000, and includes a data connector and a power connector. For example, when a Serial Advanced Technology Attachment (SATA) I/F is used, the connector 3000 may include a 7-pin SATA data connector and a 15-pin SATA power connector.

First of all, the components of the storage device 1000 will be described.

The power supply device 180 is a device for supplying a power source voltage required for the storage device 1000, and serves to supply reserved power to the storage device 1000 when power is abnormally cut off. In FIG. 1, a power line is indicated by the dotted line. The operation of the power supply device 180 will be described with reference to FIG. 11.

Figure 11:
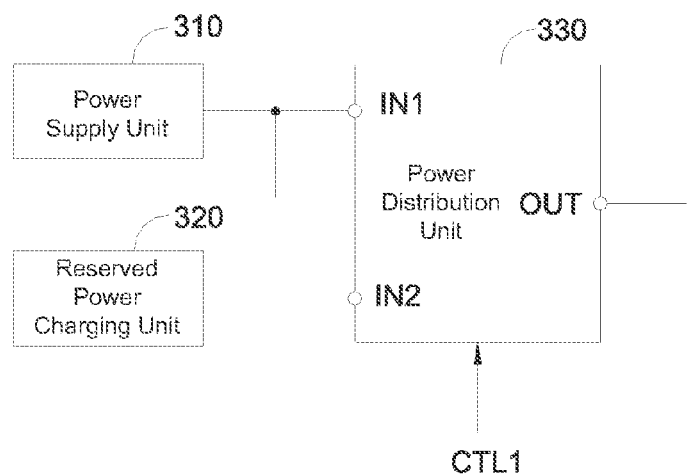
FIG. 11 is a block diagram of a power supply device illustrated in FIGS. 1 and 4.

As shown in FIG. 11, the power supply device 180 includes a power supply unit 310, a reserved power charging unit 320, and a power distribution unit 330.

The power supply unit 310 is a means for supplying power required for the storage device 1000 in a normal power on state. The reserved power charging unit 320 is a means for supplying reserved power required for performing an operation of storing address map change information required for recovering address map information in the nonvolatile memory device 170 in the storage device 1000 when power supplied from the power supply unit 310 is abnormally turned off.

A detailed operation of the reserved power charging unit 320 will be described in detail with reference to FIGS. 12 and 13.

The power distribution unit 330 serves to select power generated from the power supply unit 310 or the reserved power charging unit 320 and distribute the selected power to a required circuit in the storage device 1000 under the control of the processor 110.

In particular, in case of abnormal power off, the power distribution unit 330 supplies power charged in the reserved power charging unit 320 to the storage device 1000 according to a second control signal CTL2 applied from the processor 110.

For reference, when the storage device 1000 is initialized, the processor 110 generates a first control signal CTL1 having a logical value for connecting a first input terminal IN1 and an output terminal OUT of the power distribution unit 330. And, while power is being normally supplied, the processor 110 generates the first control signal CTL1 having a logical value for connecting a first input terminal IN1 and an output terminal OUT of the power distribution unit 330.

When power supply is abnormally turned off, the processor 110 generates a first control signal CTL1 having a logical value for connecting a second input terminal IN2 and the output terminal OUT of the power distribution unit 330.

When a voltage of power applied to the storage device is dropped to below a threshold voltage in a state in which a power off control signal is not generated, the processor 110 determines that abnormal power off has occurred. Namely, when the voltage of power output from the power supply device 180 is dropped to below the threshold voltage in a power on mode, the processor 110 determines that abnormal power off has occurred.

In this manner, while power is normally supplied according to the first control signal CTL1 generated by the processor 110, power generated from the power supply unit 310 is supplied to the storage device 1000, and when power supply is abnormally turned off, power generated by the reserved power charging unit 320 is supplied to the storage device 1000.

First, an operation of a reserved power charging unit 320' according to an embodiment of the present invention will be described with reference to FIG. 12.

Figure 12:
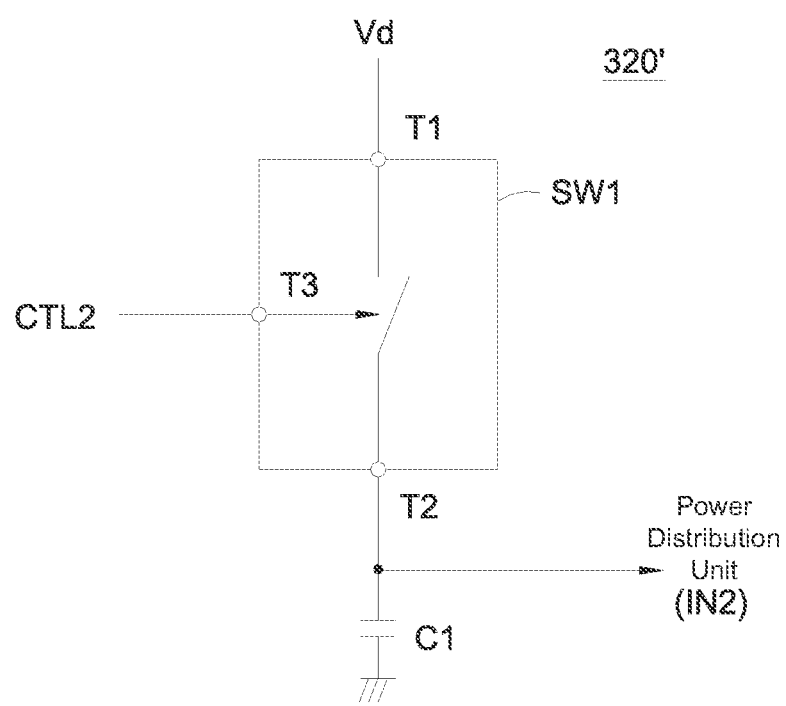
FIG. 12 is a detailed circuit configuration according to an embodiment of a reserved power charging unit illustrated in FIG. 11.

As illustrated in FIG. 12, the reserved power charging unit 320' according to an embodiment of the present invention includes a first switching unit SW1 and a capacitor C1.

A power source voltage Vd generated by the power supply unit 310 is applied to a first terminal T1 of the first switching unit SW1, a first terminal of the capacitor C1 is connected to a second terminal T2 of the first switching unit SW1, and a second terminal of the capacitor C1 is connected to a ground. A second control signal CTL2 for controlling the switching operation of the first switching unit SW1 is applied to a control terminal T3 of the first switching unit SW1. The second control signal CTL2 is generated by the processor 110 as follows.

The processor 110 generates the second control signal CTL2 having a logical value for connecting the first terminal T1 and the second terminal T2 of the first switching unit SW1 in a power on state. When abnormal power off occurs, the processor 110 generates a second control signal CTL2 having a logical value for cutting off the first terminal T1 and the second terminal T2 of the first switching unit SW1.

In this manner, according to the generated second control signal CTL2, in a power on state, the power source voltage Vd is charged to the capacitor C1, and in a state in which supplied power is abnormally cut off, the voltage charged in the capacitor C1 is applied to the second input terminal IN2 of the power distribution unit 330. Namely, when the supplied power is abnormally cut off, the voltage charged in the capacitor C1 is supplied as reserved power to the storage device.

With reference back to FIG. 1, the processor 110 interprets commands and controls the components of the data storage device according to the interpretation results. The processor generates various control signals required for controlling the power supply device 180. Also, the processor 110 may include a code object management unit, and may load a code object stored in the storage medium 150 to the RAM 130 by using the code object management unit. The processor 110 loads code objects to the RAM 130 for executing the method for managing address map information and the access method in a disk drive according to the flow charts of FIGS. 17 to 24, and the method for managing address map information through a network according to the flow chart of FIG. 41.

Figure 41:
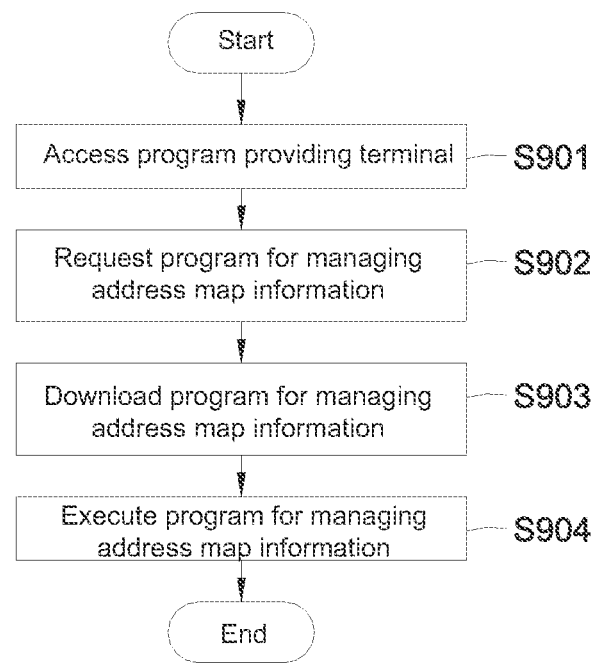
FIG. 41 is a view showing a network configuration for explaining a method for managing address map information through a network according to an embodiment of a technical concept of the present invention.

Then, the processor 110 may execute tasks with respect to the method for managing address map information and the access method in a disk drive according to the flow charts of FIGS. 17 to 24, and the method for managing address map information through a network according to the flow chart of FIG. 41 by using the code objects loaded to the RAM 130. The method for managing address map information, the access method in a disk drive, and the method for managing address map information through a network executed by the processor 110 will be handled in detail in a description of FIGS. 17 to 24 and FIG. 41.

The ROM 120 stores program codes and data required for operating the data storage device.

The program codes and data stored in the ROM 120 or the storage medium 150 are loaded to the RAM 130 under the control of the processor 110. In an embodiment of the present invention, when the storage device is initialized, the processor 110 loads address mp information stored in the storage medium 150 to the RAM 130. If it is designed to store address map information in the nonvolatile memory device 170, when the storage device is initialized, the processor 110 loads the address map information stored in the nonvolatile memory device 170 to the RAM 130. Address map change information generated whenever data is written is stored in the RAM 130.

The address map change information may include information regarding a position of data written without being reflected in address map information stored in the storage medium 150 or the nonvolatile memory device 170. The address map change information may include a logical band number, a virtual band number, and a finally accessed virtual address. The address map change information may include a logical band number with respect to data written without being reflected in address map information stored in the storage medium 150 or the nonvolatile memory device 170, a virtual band number allocated to the logical band, and a finally accessed virtual address in the virtual band allocated to the logical band.

The RAM, as a volatile memory device, may be implemented as a DRAM or an SRAM. Also, the RAM 130 may be designed to be driven according to an SDR (Single Data Rate) method or a DDR (Double Data Rate) method.

The storage medium 150 is a main storage medium of the storage device, and may include a disk or a non-volatile semiconductor memory device. For example, the storage device may include a disk drive and a detailed configuration of a head disk assembly 100, including a disk and a head in the disk drive, is shown in FIG. 3.

Figure 3:
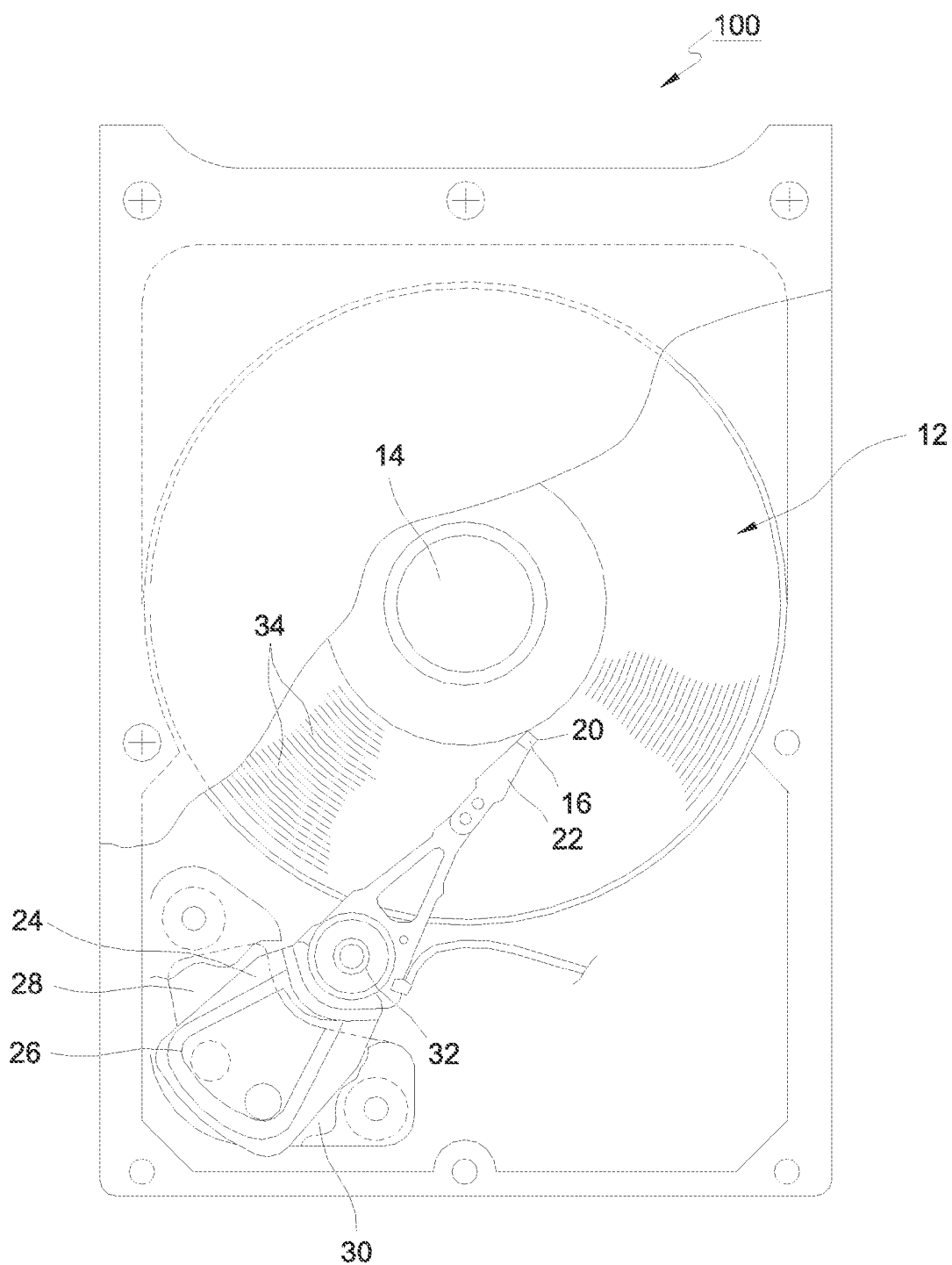
FIG. 3 is a plan view of a head disk assembly according to an embodiment of a technical concept of the present invention.

Referring to FIG. 3, the head disk assembly 100 includes at least one disk 12 rotated by a spindle motor 14. The disk drive may also include a head 16 positioned adjacent to a surface of the disk 12.

The head 16 senses and magnetizes a magnetic field of each disk 12, thereby reading information from or writing information to the rotating disk 12. Typically, the head 16 is coupled to a surface of each disk 12. Although a single head 16 is illustrated, the head 16 needs to be regarded as including a write head for magnetizing the disk 12 and a separate read head for sensing the magnetic field of the disk 12. The read head may include a magneto-resistive (MR) element. The head 16 may be referred to as a magnetic head or a head.

The head 16 may be incorporated into a slider 20. The slider 20 is configured to generate an air bearing between the head 16 and the surface of the disk 12. The slider 20 is coupled to a head gimbal assembly 22 that is attached to an actuator arm 24 having a voice coil 26. The voice coil 26 is positioned adjacent to a magnetic assembly 28 so as to define a Voice Coil Motor (VCM) 30. A current provided to the voice coil 26 generates a torque which rotates the actuator arm 24 with respect to a bearing assembly 32. The rotation of the actuator arm 24 moves the head 16 across the surface of the disk 12.

Information is usually stored in ring-shaped tracks 34 of the disk 12. Each track 34 generally includes multiple sectors. A sector structure of a track is illustrated in FIG. 5.

Figure 5:
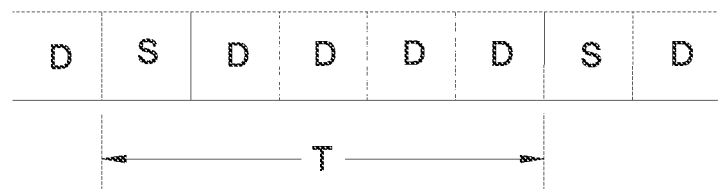
FIG. 5 is a view showing a sector structure of one track of a disk as a storage medium applied to the present invention.

As shown in FIG. 5, one servo sector T includes a servo information field S and a data field. The data field may include a plurality of data sectors D. Of course, one servo sector may include a single data sector D. The data sector is also called a sector. The data sector D may include an area for storing data and a spare area.

In an embodiment of the present invention, a logical block address (LBA) corresponding to data written to the data sector D is written in the spare area of the corresponding data sector D.

Figure 6:
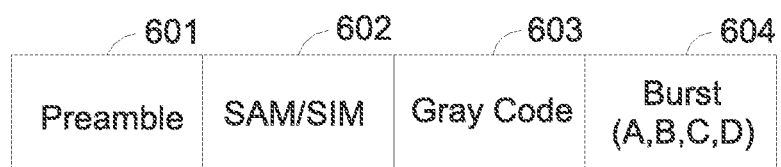
FIG. 6 is a view showing a structure of a servo information area illustrated in FIG. 5.

Also, signals as illustrated in FIG. 6 are recorded to the servo information field S.

As shown in FIG. 6, a preamble 601, a servo synchronization indication signal 602, a gray code 603, and a burst signal 604 are written to the servo information field S.

The preamble 601 provides clock synchronization when reading servo information, and provides a predetermined timing margin by setting a gap before the servo sector. Also, the preamble 601 is used to determine a gain (not shown) of an automatic gain control (AGC) circuit.

The servo synchronization indication signal 602 consists of a servo address mark (SAM) and a servo index mark (SIM). The servo address mark is a signal that indicates a start of a sector, and the servo index mark is a signal that indicates a start of a first servo sector in a track.

The gray code 603 provides track information, and the burst signal 604 is used to control the head 16 to follow the center of the track 34. For example, the burst signal may include four patterns A, B, C, and D, and four burst patterns are combined to generate a position error signal used to control track following.

The disk 12 is divided into a maintenance cylinder area, which is inaccessible to a user, and a user data area, which is accessible to the user. The maintenance cylinder area may be referred to as a system area. Various information required to control the disk drive is stored in the maintenance cylinder area, as well as information required to perform the storage medium access method, data writing method, and storage device parameter adjustment method according to the present invention. Particularly, the maintenance cylinder area stores a mapping table for converting a logical block address LBA into a virtual address VA based on a virtual zone or virtual band.

Here, the address map information may include information for converting a logical block address received from the host device into a physical address of the storage medium based on a virtual band corresponding to the physical area of the storage medium including a disk.

In detail, the address map information may include mapping information between a logical band classified as an aggregate of logical block addresses and a virtual band corresponding to a physical area of the storage medium and mapping information between a logical block address in a virtual band allocated to a logical band and a virtual address.

Also, the address map information may include mapping table information indicating a correspondence relationship of a physical address of the storage medium to a logical block address. Also, the address map information may include mapping table information indicating an allocation relationship between the logical band classified as an aggregate of logical block addresses and a virtual band corresponding to a physical area of the storage medium and an allocation relationship between the logical block address in the logical band and the virtual address.

The head 16 moves across the surfaces of the disk 12 in order to read or write information in different tracks. A plurality of code objects used to realize various functions of the disk drive may be stored in the disk 12. For example, a code object for executing an MP3 player function, a code object for executing a navigation function, a code object for executing various video games, and the like, may be stored in the disk 12.

Referring again to FIG. 1, the storage medium interface 140 is an element that enables the processor 110 to access the storage medium 150 in order to write and read information. In detail, the storage medium interface 140 in the storage device that is implemented as a disk drive includes a servo circuit controlling the head disk assembly 100 and a read/write channel circuit performing signal processing for data reading/writing.

The host interface 160 performs data transmission/reception to/from the host device 2000 such as a personal computer, a mobile device, etc., and may be an interface having various sizes, such as a serial advanced technology attachment (SATA) interface, a parallel advanced technology attachment (PATA) interface, or a universal serial bus (USB) interface.

The nonvolatile memory device 170 may be implemented as a nonvolatile semiconductor memory device. For example, the nonvolatile memory device 170 may be implemented as a flash memory, a PRAM (Phase change RAM), an FRAM (Ferroelectric RAM), a MRAM (Magnetic RAM), or the like.

Address map change information is stored in the nonvolatile memory device 170. In detail, when supplied power is abnormally cut off, the address map change information stored in the RAM 130 is read and stored to the nonvolatile memory device 170 under the control of the processor 110.

The bus 170 transfers information between the elements of the storage device.

Next, a software operation system of a hard disk drive, which is an example of the storage device, will be described with reference to FIG. 2.

Figure 2:
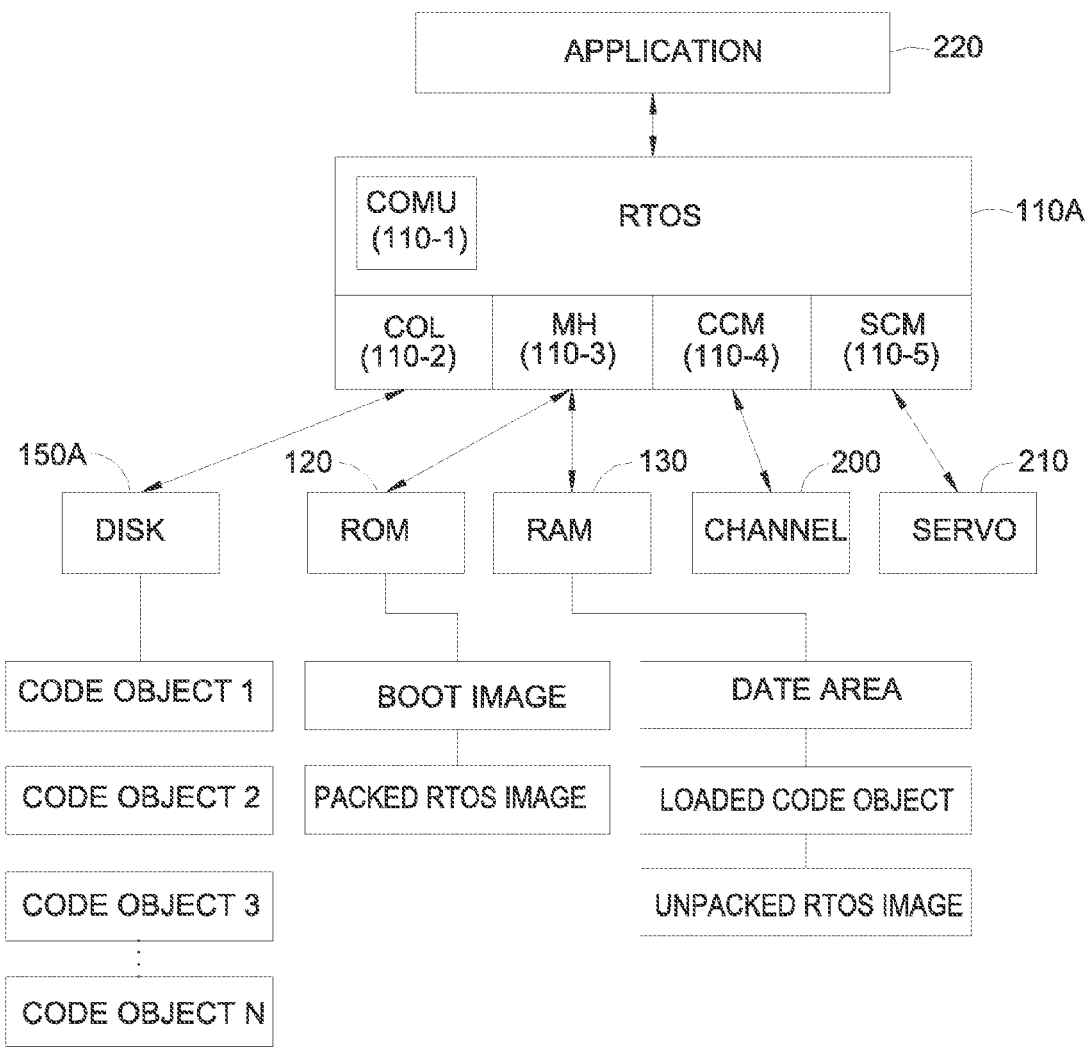
FIG. 2 is a view showing a software operating system of a storage device illustrated in FIG. 1.

As shown in FIG. 2, a plurality of code objects 1 through N are stored in a disk 150A, which is a storage medium of the hard disk drive (HDD).

The ROM 120 stores a boot image and a packed real time operating system (RTOS) image.

The plurality of code objects 1 through N are stored in the disk 150A. The code objects stored in the disk may include not only code objects required for operating the disk drive but also code objects related to various functions that may be extended to the disk drive. In particular, code objects for executing the method for managing address map information and the access method in a disk drive according to the flow charts of FIGS. 17 to 24, and the method for managing address map information through a network according to the flow chart of FIG. 41 are stored in the disk 150A. Obviously, the code objects for executing the methods according to the flowcharts of FIGS. 17 to 24 and FIG. 41 may also be stored in the ROM 120 instead of the disk 150A. Also, code objects performing various functions such as a MP3 player function, a navigation function, a video game function, or the like may also be stored in the disk 150A.

The RAM 130 reads the boot image from the ROM 120 while booting the disk drive, and an unpacked RTOS image is loaded to the RAM 130. Also, code objects required to operate a host interface stored in the disk 150A are loaded to the RAM 130. In particular, the address map information is loaded to the RAM 130. Also, the address map change information generated whenever a data write operation is performed is stored in the RAM 130.

Circuits that are required to perform signal processing for data reading/writing are included in a channel circuit 200, and circuits required for controlling the head disk assembly 100 for performing data reading/writing operations are included in a servo circuit 210.

An RTOS 110A is a real time operating system program and is a multi-program operating system using a disk. In the RTOS 110A, real time multi-processing is performed as a foreground process having high priority, and batch processing is performed as a background process having low priority according to a task. Also, the RTOS 110A loads code objects from the disk and unloads code objects onto the disk.

The RTOS 110A manages a code object management unit (COMU) 110-1, a code object loader (COL) 110-2, a memory handler (MH) 110-3, a channel control module (CCM) 110-4, and a servo control module (SCM) 110-5 to perform tasks according to requested commands. The RTOS 110A also manages application programs 220.

In detail, the RTOS 110A loads code objects required for controlling the disk drive to the RAM 130 when booting the disk drive. Accordingly, after the booting is executed, the disk drive may be operated by using code objects loaded to the RAM 130.

The COMU 110-1 stores location information regarding locations to which code objects are written, and arbitrates a bus. Also, the COMU 110-1 stores information regarding priorities of performed tasks. In addition, the COMU 110-1 manages task control block (TCB) information required to execute tasks for code objects, and stack information.

The COL 110-2 loads the code objects stored in the disk 150A to the RAM 130 using the COMU 110-1 and unloads the code objects stored in the RAM 130 to the disk 150A. Accordingly, the COL 110-2 may load the code objects stored in the disk 150A used to execute the methods according to the flowcharts of FIGS. 17 to 24 and FIG. 41 to the RAM 130.

The RTOS 110A may execute the methods according to the flowcharts of FIGS. 17 TO 24 and FIG. 41, which will be described below, by using the code objects loaded to the RAM 130.

The MH 110-3 performs writing or reading data to/from the ROM 120 and the RAM 130.

The CCM 110-4 performs channel controlling required for performing signal processing for data reading/writing, and the SCM 110-5 performs servo controlling including the head disk assembly for performing data reading/writing.

Figure 4:
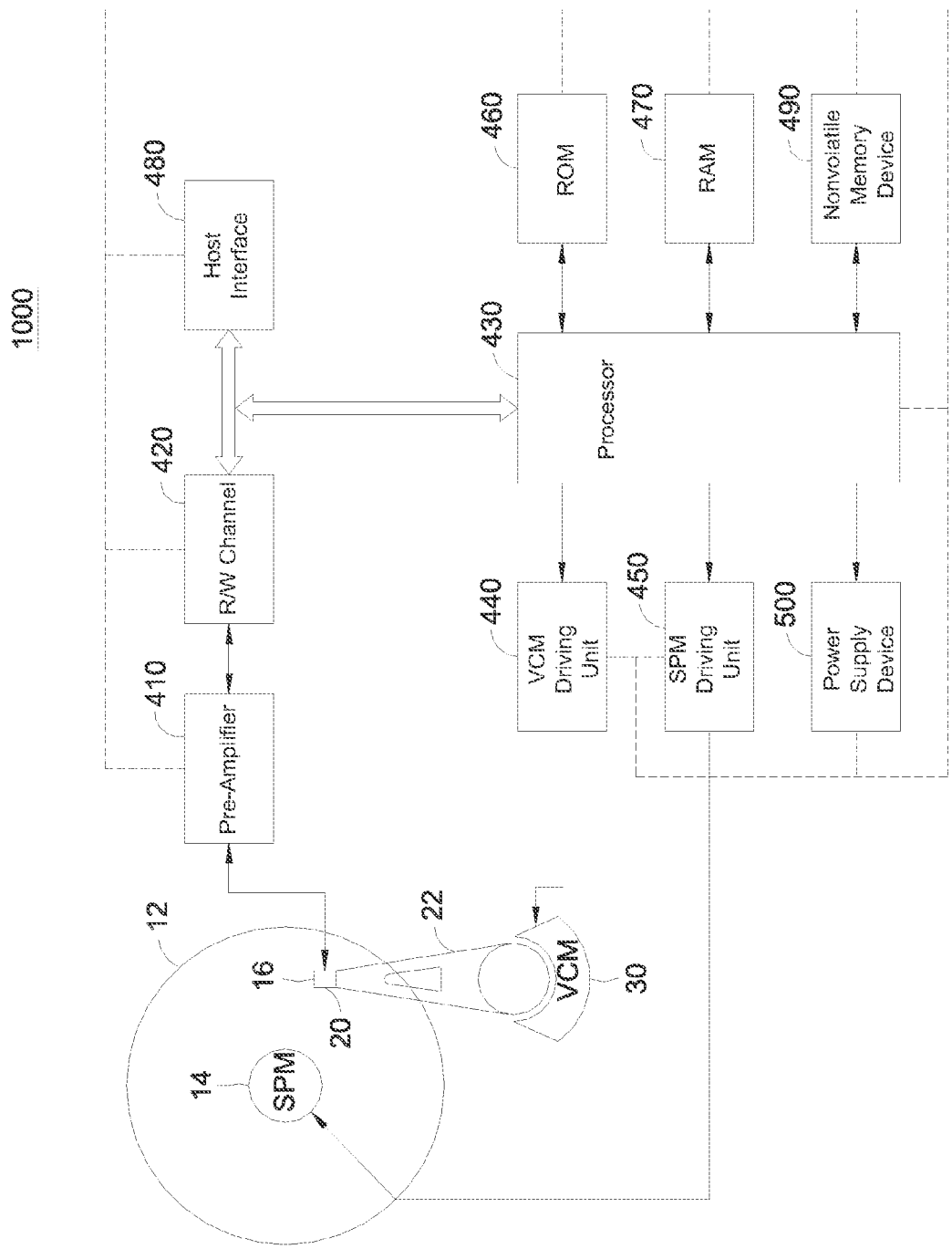
FIG. 4 is a view showing an electrical configuration of a disk drive according to an embodiment of a technical concept of the present invention.

Next, an electrical circuit configuration of the disk drive 1000 as an example of a storage device according to an embodiment of a technical concept of the present invention illustrated in FIG. 1 is illustrated in FIG. 4.

As shown in FIG. 4, the disk drive 1000 according to an embodiment of a technical concept of the present invention includes a pre-amplifier 410, a Read/Write (R/W) channel 420, a processor 430, a Voice Coil Motor (VCM) driver 440, a Spindle Motor (SPM) driver 450, an ROM 460, a RAM 470, a host interface 480, a nonvolatile memory device 490, and a power supply device 500.

The processor 430 may be a Digital Signal Processor (DSP), a microprocessor, a microcontroller, or the like. The processor 430 controls the R/W channel 420 to read information from the disk 12 or write information to the disk 12 according to a command received from the host device 2000 through the host interface 480.

The processor 430 is coupled to the VCM driver 440 which provides a driving current for driving the VCM 30. The processor 430 provides a control signal to the VCM driver 440 to control motion of the head 16.

The processor 430 is coupled to the SPM driver 450, which provides a driving current for driving a spindle motor (SPM) 14. The processor 430, upon being supplied with power, provides a control signal to the SPM driver 450 to rotate the SPM 14 at a target speed.

The processor 430 is coupled to the power supply device 500 and generates control signals for controlling the power supply device 500.

The processor 430 is also coupled to the ROM 460 and the RAM 470. The ROM 460 stores firmware and control data for controlling the disk drive. The ROM 460 also stores program codes and information for executing the methods according to the flowcharts of FIGS. 17 to 24 and FIG. 41. Obviously, the program codes and information for executing the methods according to the flowcharts of FIGS. 17 to 24 and FIG. 41 may be stored in the maintenance cylinder area of the disk 12, instead of the ROM 460.

The RAM 470 loads the program codes stored in the ROM 460 or the disk 12 in an initialization mode under the control of the processor 430, and temporarily stores data received through the host interface 480 or data read from the disk 12. In particular, address map information is loaded to the RAM 470 in an initialization mode. Namely, address map information is stored in the RAM 470 in an initialization mode. Also, address map change information generated whenever a data write operation is executed is stored in the RAM 470.

The RAM 470 may be implemented by a Dynamic Random Access Memory (DRAM) or a Synchronous Random Access Memory (SRAM). The RAM 570 may be designed to operate in a Single Data Rate (SDR) or Double Data Rate (DDR) scheme.

The processor 430 may control the disk drive so as to execute the methods according to the flowcharts of FIGS. 17 to 24 and FIG. 41 using program codes and information stored in the ROM 460 or the maintenance cylinder area of the disk 12.

The RAM 490 may be implemented as a flash memory, a PRAM (Phase change RAM), an FRAM (Ferroelectric RAM), a MRAM (Magnetic RAM), or the like.

Address map change information is stored in the nonvolatile memory device 490. In detail, when supplied power is abnormally cut off, the address map change information stored in the RAM 470 is read and stored to the nonvolatile memory device 490 under the control of the processor 430.

The power supply device 500 is a device for supplying a power source voltage required for the disk drive, and when power is abnormally cut off, the power supply device 500 supplies reserved power to the disk drive. In FIG. 4, a power source line is indicated by the dotted line. A detailed configuration example of the power supply device 500 is illustrated in FIG. 11.

FIG. 11 has been already described above, so repetitive descriptions will be omitted.

Figure 13:
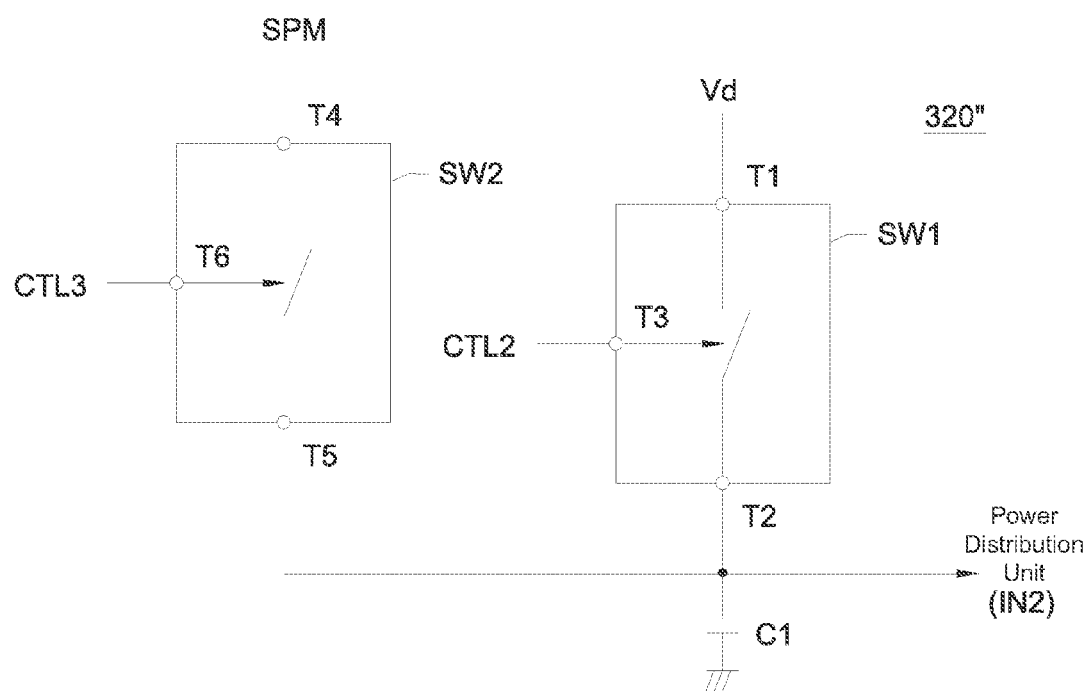
FIG. 13 a detailed circuit configuration according to another embodiment of a reserved power charging unit illustrated in FIG. 11.

The reserved power charging unit 320 illustrated in FIG. 11 may be designed as shown in FIG. 12 or may also be designed as shown in FIG. 13. A detailed configuration of the reserved power charging unit illustrated in FIG. 12 has been already described above, so repetitive descriptions thereof will be omitted.

Another embodiment of the reserved power charging unit illustrated in FIG. 13 will be described.

As shown in FIG. 13, a reserved power charging unit 320" according to another embodiment of the present invention includes a first switching unit SW1, a second switching unit SW2, and a capacitor C1.

A power source voltage Vd generated by the power supply unit 310 is applied to a first terminal T1 of the first switching unit SW1, a first terminal of the capacitor C1 is connected to a second terminal T2 of the first switching unit SW1, and a second terminal of the capacitor C1 is connected to a ground. A second control signal CTL2 for controlling the switching operation of the first switching unit SW1 is applied to a control terminal T3 of the first switching unit SW1. A terminal of a spindle motor SPM generating counter electromotive force is connected to a first terminal T4 of the second switching unit SW2, a first terminal of the capacitor C1 is connected to a second terminal T5 of the second switching unit SW2, and a third control signal CTL3 for controlling a switching operation of the second switching unit SW2 is applied to a control terminal T6 of the second switching unit SW2. The second control signal CTL2 and the third control signal CTL3 are generated by the processor 430 as follows.

The processor 430 generates the second control signal CTL2 having a logical value for connecting the first terminal T1 and the second terminal T2 of the first switching unit SW1 in a power on state. In a state in which supplied power is abnormally cut off, the processor 430 generates a second control signal CTL2 having a logical value for cutting off the first terminal T1 and the second terminal T2 of the first switching unit SW1.

In this manner, according to the generated second control signal CTL2, in a power on state, the power source voltage Vd is charged to the capacitor C1, and in a state in which supplied power is abnormally cut off, the voltage charged in the capacitor C1 is applied to the second input terminal IN2 of the power distribution unit 330. Namely, when the supplied power is abnormally cut off, the voltage charged in the capacitor C1 is supplied as reserved power to the storage device.

In the state in which supplied power is abnormally cut off, the processor 430 generates a third control signal CTL3 having a logical value for connecting the first terminal T4 and the second terminal T5 of the second switching unit SW2, and applies the generated third control signal CTL3 to the control terminal T6 of the second switching unit SW2. Accordingly, the capacitor C1 is charged by counter electromotive force (BEMF) generated from the spindle motor 14 rotated by inertia after supplied power is cut off.

With reference to FIG. 4, a data read operation and a data write operation executed after a physical address of a disk corresponding to a logical block address designated by a read command or a write command will be described.

In a data read mode, the disk drive amplifies an electrical signal sensed by the head 16 from the disk 12 in a pre-amplifier 410. And then, a signal output from the pre-amplifier 410 by an automatic gain control circuit (not shown) which automatically varies a gain according to the amplitude of a signal in the read/write channel 420, converted into a digital signal, and then, decoded to detect data. For example, the detected data is subjected to error correction processing using a Reed-Solomon code as an error correction code, converted into stream data, and then, transmitted to the host device 2000 through the host interface 480.

In a data write mode, the disk drive receives data and LBAs from the host device through the host interface 480, adds an error correction symbol by the Reed-Solomon code to the data by the processor 430, encoded to fit a record channel by the read/write channel 420, and then, recorded in the disk 12 through the head 16 by a record current amplified by the pre-amplifier 410. In an embodiment of the present invention, corresponding LBAs are written to data stored in a sector of a spare area allocated to each sector in a data write mode.

An operation for executing the method according to the flow chart of FIGS. 17 to 24 and FIG. 41 by the processor 430 by using the program codes and information loaded to the RAM 470 will be described.

First, a shingled write method, a novel write method proposed to enhance a record density in a disk drive as one of storage devices according to an embodiment of the present invention will be described.

Figure 7:
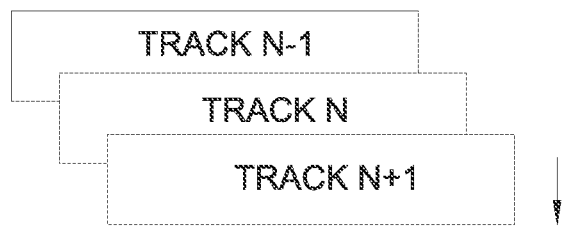
FIG. 7 is a view conceptually showing a shape of a track according to a generation of flux in a shingled write scheme according to an embodiment of a technical concept of the present invention.

The shingle write method is a writing method in which data is written only in one direction as tracks on a disk are overwritten as if shingles are stacked. That is, as shown in FIG. 7, in the shingle write method, assuming that data is written only in the arrow direction, an (N−1)th track is partially overwritten when an Nth track adjacent to the (N−1)th track is written, and the Nth track is partially overwritten when the (N+1)th track adjacent to the Nth track is written, thereby increasing the TPI (Track Per Inch) characteristic, which is the radial recording density of a storage medium.

Figure 8:
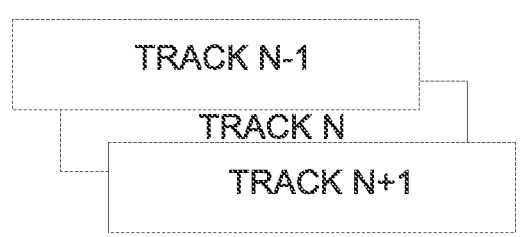
FIG. 8 is a view conceptually showing a shape of a track according to an adjacent track interference phenomenon in the shingled write scheme according to an embodiment of a technical concept of the present invention.

The shingle write method has to satisfy the restriction that the (N−1)th track cannot be written after writing the Nth track because a flux is always generated only in one direction. As shown in FIG. 8, if the (N−1)th track in the direction opposite to the shingle write direction is written after writing the Nth track, the Nth track is erased due to an adjacent track interference (ATI) effect.

Accordingly, to solve this problem, there is a need for a technique of dynamically allocating a new disk address for a logical block address (LBA) provided from a host so as to always perform writing only in either one of the inner and outer circumferential directions of the disk.

The present invention provides a disk accessing method, which uses an existing LBAs as it is by using a virtual address in the process of converting the existing LBAs into a cylinder head sector (CHS), i.e., a physical address of a disk drive, and satisfies the condition that the shingle write direction in the disk drive is limited to only one direction.

Figure 9:
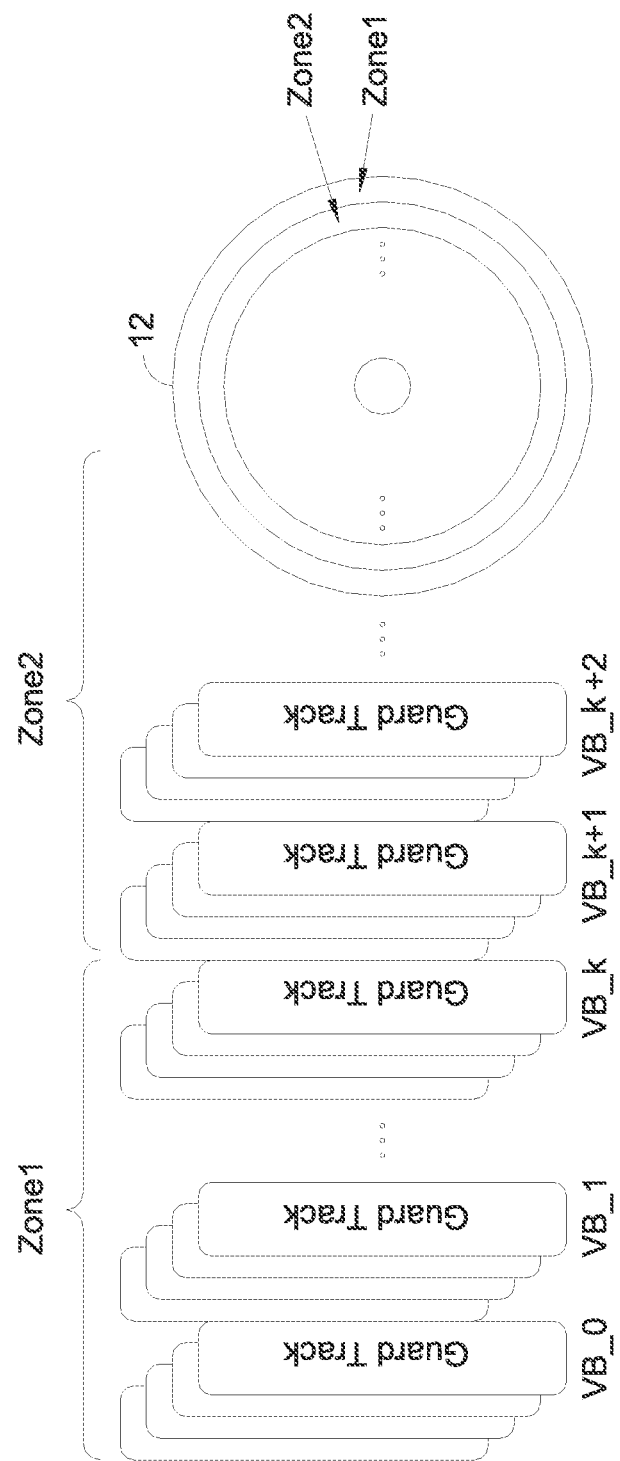
FIG. 9 is a view schematically showing a configuration of a physical zone and a virtual band with respect to a storage medium according to an embodiment of a technical concept of the present invention.

Referring to FIG. 9, the configurations of a zone and virtual bands for realizing the accessing method suggested in the present invention will be described.

A storage area of the disk 12 is divided into a plurality of physical zones. The TPI (tracks per inch), i.e., recording density, and BPI (bits per inch) for each physical zone may be differently set. Each physical zone includes a plurality of virtual bands, and each virtual band is defined as a set of consecutive M tracks to be overwritten. Also, a guard track is arranged between the virtual bands to avoid overwriting between the virtual bands. Referring to FIG. 9, (K+1) number of virtual bands VB_0 to VB_K are arranged in physical zone 1. That is, a virtual band is defined as a segment of a unit size of a physical storage space of a storage medium. In the track included in the virtual bands, address map information is generated such that data is sequentially written in any one of an inner circumferential direction or outer circumferential direction of the disk.

Next, the structure of allocating logical bands and virtual bands for each zone will be described with reference to FIG. 10.

Figure 10:
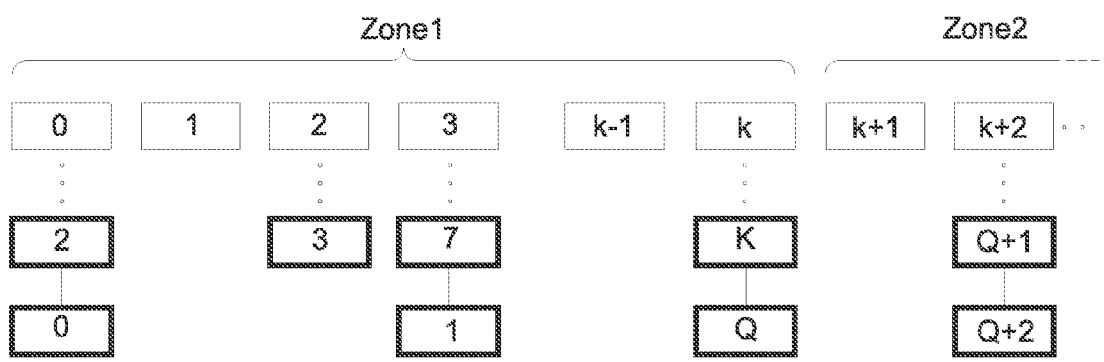
FIG. 10 is a view schematically showing a structure of a virtual band allocated to a logical band by physical zone of the storage medium according to an embodiment of a technical concept of the present invention.

FIG. 10 is a view schematically showing the structure of allocating virtual bands VB to logical bands LB for each physical zone of a storage medium according to an embodiment of the inventive concept.

As shown in FIG. 10, virtual bands are allocated to logical bands in order to perform an actual writing operation in a physical zone of a storage medium. Physical zone 1 of the storage medium may consist of (K+1) number of logical bands. A logical band is defined as a set of consecutive logical block addresses in units of a first size. That is, a logical band refers to a set of consecutive writable logical block addresses.

For example, assuming that the range of logical block addresses of physical zone 1 consists of 10,000 LBAs of 0 through 999, and each of the logical bands belonging to physical zone 1 is defined as a set of 1,000 LBAs, the number of logical bands included in physical zone 1 is 10.

The number of virtual bands is set to Q (Q>K), which is more than the number of logical bands. The virtual bands are defined as the segments of the physical storage device of the storage in units of a second size. That is, if the storage medium is a disk, a virtual band is defined as a set of M tracks to be overwritten.

Virtual bands not allocated to logical bands may be referred to as reserved virtual bands. In other words, storage areas corresponding to the virtual bands not allocated to the logical bands may be referred to as reserved areas. Reserved virtual band information is stored in a free queue to be explained in FIG. 16 below.

An operation of managing address map information in a storage device including a storage device for accessing by using a virtual band will be described.

Figure 14:
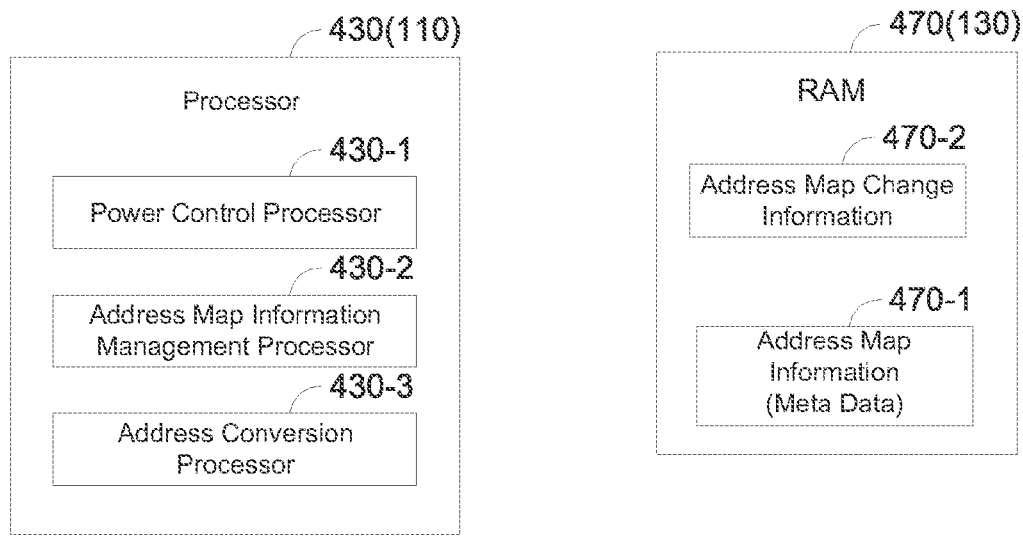
FIG. 14 is a view showing a detailed configuration of a processor and a RAM of a storage device according to an embodiment of a technical concept of the present invention.

FIG. 14 is a view showing a detailed configuration of the processor 110 and the RAM 130 of the storage device illustrated in FIG. 1 and the processor 430 and the RAM 470 of the disk drive illustrated in FIG. 4 according to an embodiment of the present invention. For the sake of explanation; FIG. 14 will be described with reference to the disk drive of FIG. 4.

As shown in FIG. 14, the processor 430 includes a power control processor 430-1, an address map information management processor 430-2, and an address conversion processor 430-3.

Address map information 470-1 is loaded to the RAM 470 under the control of an address map information management processor 430-2. Here, the address map information may include information for converting a logical block address into a physical address of a storage medium by using a virtual address. The address map information may be, for example, mapping table information showing an allocation relationship between a logical band and a virtual band, and an allocation relationship between a logical block address and a virtual address in a virtual band allocated to a logical band. Also, the address map information may be included in meta information.

The address map information 470-1 may be read from the nonvolatile memory device 490 or the disk 12 and stored to the RAM 470. The address map information 470-1 may be configured to search for a virtual address based on LBA. The virtual address may be defined based on a physical address in a storage medium. When the storage medium is a disk, the virtual address may be defined based on a physical address of a sector. Also, the virtual address of the disk may be defined based on CHS (Cylinder Header Sector). Besides, the virtual address of the disk may be defined based on a physical zone, a virtual band, a track, and a sector. The address map information 470-1 may be generated such that data is sequentially written in any one of an inner circumferential direction and an outer circumferential direction in a track of the disk included in a virtual band according to the shingled write method.

The address map information 470-1 may include information representing an allocation structure of logical bands and virtual bands for each physical zone. That is, the address map information 470-1 may include information representing the mapping structure of virtual bands allocated to logical bands for each physical zone as shown in FIG. 10.

Address map information showing an allocation state of the virtual bands allocated to the logical bands illustrated in FIG. 10 may be generated as shown in FIG. 25.

As shown in FIG. 25, the address map information may include a logical band number LBA NO, a virtual band number VB NO, and a finally accessed virtual address number LA VA in a virtual band.

With reference to FIG. 25, it can be seen that virtual band numbers 2 and 0 are allocated to a logical band number 0, a finally accessed virtual address in the virtual band number 2 is 199, and a finally accessed virtual address in the virtual band number 0 is A.

For example, when the size of virtual bands is allocated into 200 sectors, and virtual addresses 0 to 199 are set for each virtual band, the final virtual address 199 is allocated to the virtual band number 2, so there is no virtual address which can be newly allocated. In case in which 'A' has a value smaller than 199, when a write command with respect to LBAs included in a logical band 0 is received, the address map information is updated such that a virtual address (A+1) of the virtual band number 0 is mapped to LBAs designated by the write command.

In FIG. 25, A, B, C, and D are virtual addresses having an integer value between 1 and 199.

Figure 26:
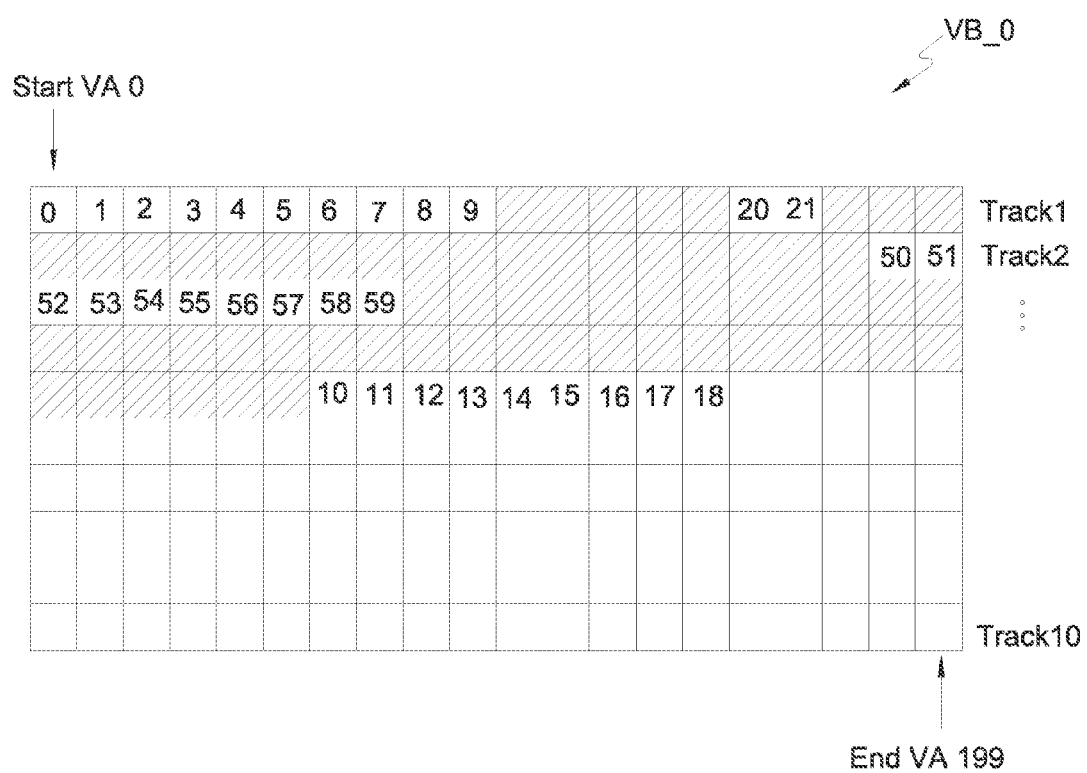
FIG. 26 is a conceptual view showing a mapping structure of a virtual address (VA) with respect to an LBA in a virtual band number 0.

An example of a mapping structure of virtual addresses (VA) with respect to LBAs in the virtual band 0 (VB_0) allocated to the logical band number 0 is illustrated in FIG. 26.

With reference to FIG. 26, the virtual band 0 (VB_0) includes virtual addresses 0 to 199, and the virtual addresses are allocated by sector. Thus, according to FIG. 26, 200 sectors are included in a unit virtual band. Thus, in FIG. 26, 200 sectors are included in a unit virtual band. Horizontal lines show sectors included in a single track. As shown in FIG. 26, one track includes 20 sectors. 20 sectors included in a track 1 are designated as virtual addresses 0 to 19, respectively. The 20 sectors included in a track 10 are designated as VAs 180 to 199 in the same manner.

As shown in FIG. 26, LBAs 0 to 9 are allocated to VAs 0 to 9, LBA 20 and 21 are allocated to VAs 15 and 16, LBAs 50 to 59 are allocated to VAs 38 to 47, and LBAs 10 to 18 are allocated to VAs 86 to 94. VAs 10 to 14, 17 to 37, and 48 to 85 represent invalidated virtual addresses, and VAs 95 to 199 represent non-allocated valid virtual addresses. The invalidated virtual addresses refer to previous virtual addresses corresponding to updated LBAs.

Figure 27A:
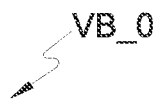
FIG. 27A is a view showing an example of address map information with respect to the virtual band number 0 illustrated in FIG. 26.

Address map information with respect to virtual band 0(VB_0) illustrated in FIG. 26 may be generated as shown in FIG. 27A, for example.

FIG. 27A is a view showing a mapping table simply showing mapping relationships of Vas corresponding to individual LBAs allocated in VB_0. The mapping table having the structure as shown in FIG. 27A has a structure in which VAs corresponding to respective LBAs are simply arranged, so the amount of data is disadvantageously large.

Thus, in order to complement the shortcomings, a method of generating address map information by grouping a group in which LBAs and Vas are sequentially increased together is proposed.

Namely, in the newly proposed address map information, a group in which LBAs and Vas are sequentially increased together is represented by a start LBA, a start VA, and a number (SCN) of sequentially increased sector.

With reference to FIG. 26, In VAs 0 to 9, LBAs 0 to 9 are sequentially increased, in VAs 15 to 16, LBA 20 to 21 are sequentially increased, in VAs 38 to 47, LBA 50 to 59 are sequentially increased, and in VAs 86 to 94, LBAs 10 to 18 are sequentially increased.

The mapping information regarding the four groups in which LBAs and VAs are sequentially increased together as described above may be shown in FIG. 27B.

With respect to a group in which LBAs 0 to 9 are sequentially increased in VAs 0 to 9, a start LBA 0, a start VA 0, and the number of sequentially increased sectors is 10, so (LBA, SCN, VA) may be represented as (0, 10, 0).

In the same manner, with respect to a group in which LBAs 20 to 21 are sequentially increased in VAs 15 to 16, since the start LBA 20, the start VA 15, and the number of sequentially increased sectors is 2, (LBA, SCN, VA) may be represented by (20, 2, 15). Also, in a group in which LBAs 50 to 59 are sequentially increased in VAs 38 to 47 may be represented by (50, 10, 38), and in a group in which LBAs 10 to 18 in VA 86-94, (LBA, SCN, VA) may be represented by (10, 9, 86).

Figure 27B:
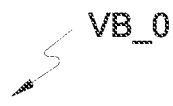
FIG. 27B is a view showing another example of address map information with respect to the virtual band number 0 illustrated in FIG. 26.

To sum up, the address map information of FIG. 27A may be generated as shown in FIG. 27B. It can be seen that the address map information is simple and the amount of data is reduced in comparison to the address map information illustrated in FIG. 27A.

With respect to virtual bands allocated to logical bands, address map information for each virtual band may be generated in such a manner as shown in FIG. 27B.

Thus, the allocation relationship of the logical bands and the virtual bands as shown in FIG. 25, the mapping information representing a finally accessed virtual address in the virtual band, and mapping information representing VAs corresponding to LBAs in the virtual band allocated to the logical band as shown in FIG. 27A or 27B may be loaded to the RAM 470 by zone.

With reference to FIG. 14, the power control processor 430-1 generates control signals required for controlling the power supply device in FIGS. 11 to 13.

The power control processor 430-1 generates a first control signal CTL1 having a logical value connecting a first input terminal IN1 and an output terminal OUT of the power distribution unit 330.

The power control processor 430-1 generates a first control signal CTL1 having a logical value for connecting the first input terminal IN1 and the output terminal OUT. When supplied power is abnormally cut off, the power control processor 430-1 generates the first control signal CTL1 having a logical value for connecting the second input terminal IN2 and the output terminal OUT.

When a power voltage applied to the storage device is dropped to below a threshold value in a state in which power off control signal is not generated, the power control processor 430-1 determines that supplied power is abnormally cut off. Namely, when a voltage of power output in the power supply device 500 is dropped to below a threshold voltage, the power control processor 430-1 determines that abnormal power off has occurred.

While supplied power is being normally supplied according to the first control signal CTL1 generated in the power control processor 430-1 power generated by the power supply unit 310 is supplied to the circuits constituting the disk drive, and when abnormal power off occurs, power generated by the reserved power charging unit 320 is supplied to the circuits constituting the disk drive.

The power control processor 430-1 generates a second control signal CTL2 having a logical value for connecting a first terminal T1 and a second terminal T2 of the first switching unit SW1 illustrated in FIG. 13 in a power on state. In a state in which abnormal power off occurs, the power control processor 430-1 generates the second control signal CTL2 having a logical value for disconnecting the first terminal T1 and the second terminal T2 of the first switching unit SW1.

According to the second control signal CTL2, In the power on state, the power voltage Vd is charged to the capacitor C1, and in a power off state in which power supply is abnormal, the voltage charged in the capacitor C1 is applied to the second input terminal IN2 of the power distribution unit 330. Namely, when abnormal power off occurs, the voltage charged in the capacitor C1 is supplied as reserved power to the circuits constituting the disk drive.

Also, in a state in which abnormal power off occurs, the power control processor 430-1 generates a third control signal CTL3 having a logical value for connecting the first terminal T4 and the second terminal T5 of the second switching unit SW2 and applies it to the control terminal T6 of the second switching unit SW2. Accordingly, the capacitor C1 is charged by counter electromotive force (BEMF) generated from the spindle motor 14 rotating by inertia.

The address map information management processor 430-2 performs a process of managing address map information. In detail, when power is supplied to the disk drive, the address map information management processor 430-2 loads address map information stored in the nonvolatile storage device 490 to the RAM 470. Namely, the address map information management processor 430-2 reads the address map information from the disk 12 or the nonvolatile storage device 490 and stores it to the RAM 470.

The address map information management processor 430-2 changes the address map information 470-1 stored in the RAM 470 based on a write command. Namely, the address map information management processor 430-2 adds virtual band newly allocated to a logical band or virtual address information added according to LBAs in an allocated virtual band to the address map information 470-1 stored in the RAM 470. Accordingly, the address map information 470-1 stored in the RAM 470 is updated whenever a write command is executed.

Whenever a write command is executed, the address map information management processor 430-2 generates the address map change information 470-2 and stores it to the RAM 470. The address map change information 470-2 is information related to a position of data written in the disk 12 without being reflected on address map information stored in the disk 12 or the nonvolatile memory device 490. The address map change information 470-2 may be configured to include a logical band number, a virtual band number, and information regarding a finally accessed virtual address. Namely, the address map change information 470-2 may be configured by a logical band number LB NO with respect to data written to the disk 12 without being reflected on the address map information stored in the disk 12 or the nonvolatile memory 490, a virtual band number VB NO allocated to a corresponding logical band, and a virtual address LA VA finally accessed in a virtual band allocated to the corresponding logical band.

In an embodiment of the present invention, whenever the address map information 470-1 stored in the RAM 470 is updated according to a write command, the updated address map information 470-1 is not stored in the disk 12 or the nonvolatile memory device 490. The reason is because, if the process of storing the updated address map information in the disk 12 or the nonvolatile memory device 490 is performed whenever the address map information 470-1 is updated, while the address map information is being stored in the disk 12 or the nonvolatile memory device 490, a write/read process cannot be performed, degrading the performance of the disk drive.

Thus, in an embodiment of the present invention, for example, the address map information 470-1 stored in the RAM 470 is stored in the disk 12 or the nonvolatile memory device 490 under the following conditions.

When a system termination command is received, the address map information management processor 430-2 stores the address map information 470-1 stored in the RAM 470 in the disk 12 or the nonvolatile memory device 490. And, when the address map change information 470-2 stored in the RAM 470 is stored in a full state on an initially set address map change information list, the address map information management processor 430-2 stores the address map information 470-1 stored in the RAM 470 to the disk 12 or the nonvolatile memory device 490. Here, the full state refers to a state in which address map change information cannot be added to the address map change information list any further. The size of the address map change information list may be determined to be a size for storing the address map change information in the nonvolatile storage device 490 by reserved power when power is abnormally cut off.

After storing the address map information 470-1, stored in the RAM 470, to the disk 12 or the nonvolatile memory device 490, the address map information management processor 430-2 deletes the address map change information 470-2 stored in the RAM 470. Namely, after storing the address map information 470-1, stored in the RAM 470, to the disk 12 or the nonvolatile memory device 490, the address map information management processor 430-2 performs a process of deleting the address map change information 470-2.

When abnormal power off occurs, the address map information management processor 430-2 stores the address map change information 470-2 stored in the RAM 470 to the nonvolatile memory device 490 by using reserved power.

For reference, when voltage of power applied to the storage device is dropped to below a threshold voltage in a state in which power off control signal is not generated, the power control processor 430-1 determines that abnormal power off has occurred.

Accordingly, when the power control processor 430-1 determines that abnormal power off has occurred, the address map information management processor 430-2 stores the address map change information 470-2 stored in the RAM 470 to the nonvolatile memory device 490.

Figure 28A:
FIG. 28A is a conceptual view showing an allocation state of a virtual band with respect to a logical band before address map information is updated according to an embodiment of a technical concept of the present invention.
Figure 28A:
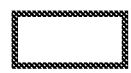
Figure 28A:
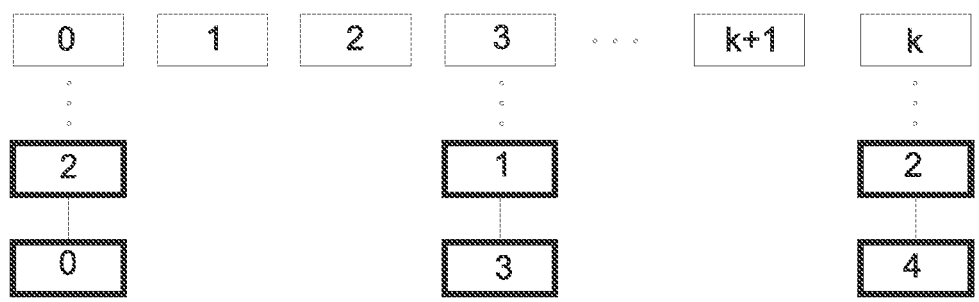
Figure 28B:
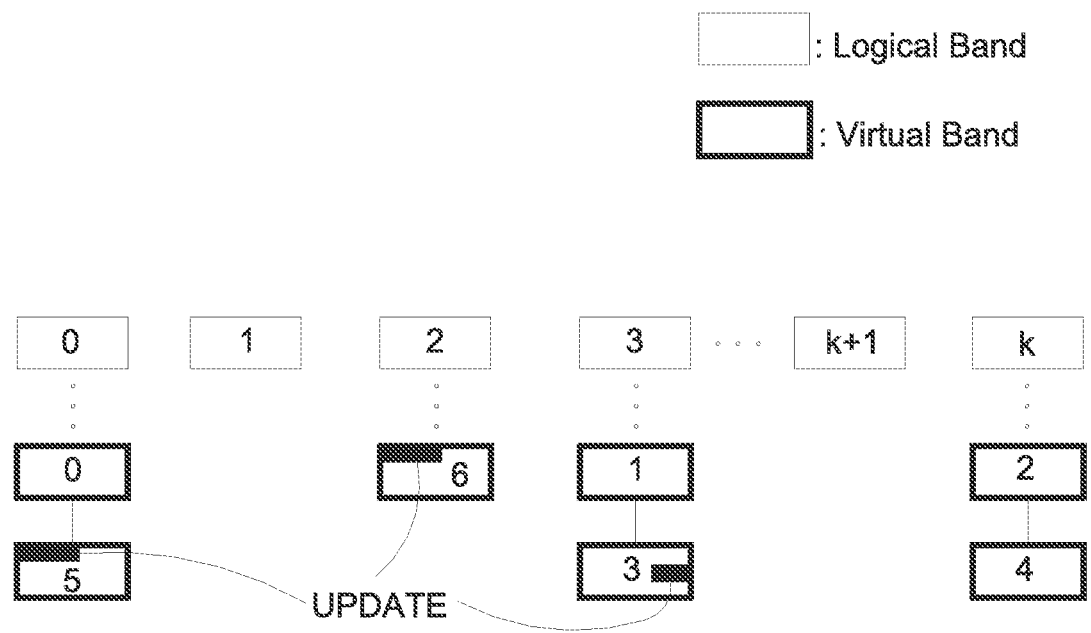
FIG. 28B is a conceptual view showing an allocation state of a virtual band with respect to a logical band according to a data write process after address map information is stored according to an embodiment of a technical concept of the present invention.

For example, it is assumed that after the address map information having an allocation state of virtual bands with respect to the logical bands as shown in FIG. 28A is stored from the disk 12 or the nonvolatile memory device 490 to the RAM 470, the address map information stored in the RAM 470 is changed to the address map information having the allocation state of the virtual bands with respect to the logical bands as shown in FIG. 28B according to performing of a write command. Also, it is assumed that power is abnormally cut off before the address map information configured by the logical bands and the virtual bands as shown in FIG. 28B stored in the RAM 470 is stored in the disk 12 or the nonvolatile memory device 490.

The address map information regarding the logical bands and the virtual bands as shown in FIG. 28A is as shown in FIG. 29.

With reference to FIG. 29, a virtual band number 0 is allocated to a logical band number 0, and the finally accessed virtual address in the virtual band number 0 is 199. Virtual band numbers 1 and 3 are allocated to the logical band number 3, a finally accessed virtual address in the virtual band number 3 is 101. Virtual band numbers 2 and 4 are allocated to a logical band number K, a finally accessed virtual address in a virtual band number 2 is 199, and a finally accessed virtual address in a virtual band number 3 is 145.

In the above description, a unit virtual band includes virtual addresses 0 to 199. Namely, the unit virtual band includes 200 sectors. Thus, the virtual bands in which the finally accessed virtual address is 199 are virtual bands in which a valid virtual address that may be allocated to the LBAs does not exist.

When the disk drive is initialized, the address map information as shown in FIG. 29 stored in the disk 12 or the nonvolatile memory 490 is loaded to the RAM 470. Also, when the disk drive is initialized, address map information indicating a mapping relationship of VAs corresponding to LBAs in each virtual band allocated to the logical bands stored in the disk 12 or the nonvolatile memory device 490 is also loaded to the RAM 470.

For example, when an allocation structure of VAs with respect to the LBAs of the virtual band number 3 allocated to the logical band number 3 is as shown in FIG. 36, address map information indicating a mapping relationship of the VAs corresponding to the LBAs with respect to the virtual band number 3 may be expressed as shown in FIG. 37. Accordingly, the address map information as shown in FIG. 37 representing the mapping relationship of VAs corresponding to LBAs in the virtual band number 3 is loaded to the RAM 470.

In this manner, the address map information indicating the mapping relationship of the VAs corresponding to the LBAs in the other remaining virtual bands allocated to the logical bands is located to the RAM 470.

Next, when the address map information stored in the RAM 470 is changed to the address map information including the logical bands and the virtual bands as shown in FIG. 28B according to performing of a write command, address map change information as shown in FIG. 30 is generated.

With reference to FIG. 28B, since updating occurs in virtual band numbers 5, 6, and 3, corresponding address map change information is generated.

When a finally accessed virtual address number in a virtual band number 5 allocated to the logical band number 0 is 13, address map change information (0, 5, 13) represented by (LB NO, VB NO, LA VA) is generated. When a finally accessed virtual address number in a virtual band number 6 allocated to the logical band number 2 is 8, address map change information (2, 6, 8) represented by (LB NO, VB NO, LA VA) is generated. When a finally accessed virtual address number in a virtual band number 3 allocated to the logical band number 3 is 106, address map change information (3, 3, 106) represented by (LB NO, VB NO, LA VA) is generated.

Thus, the address map change information 470-2 as shown in FIG. 30 is generated, and the thusly generated address map change information 470-2 is stored in the RAM 470.

In a state in which the address map change information 470-2 is stored in the RAM 470, when abnormal power off occurs, as mentioned above, the address map change information 470-2 stored in the RAM 470 is stored in the nonvolatile memory 490.

The address map information management processor 430-2 checks whether or not the address map change information has been stored in the nonvolatile memory device 490 when power is supplied to the disk drive. When the address map change information has been stored in the nonvolatile memory device 490, the address map information management processor 430-2 reads the address map change information 470-2 stored in the nonvolatile memory device 490 and stores it to the RAM 470.

When power is supplied to the disk drive, the address map information management processor 430-2 also reads the address map information 470-1 stored in the disk 12 or the nonvolatile memory device 490 and stores it to the RAM 470.

Accordingly, the address map information representing the mapping relationship of the virtual bands corresponding to the logical bands and the address map information representing the mapping relationship of the VAs corresponding to the LBAs for each virtual band allocated to the logical bands as shown in FIG. 29 are stored in the RAM 470. Also, the address map change information as shown in FIG. 30 is stored in the RAM 470.

The address map information management processor 430-2 newly allocates a virtual band number not present in the address map information among the virtual band numbers included in the address map change information to the address map information. Namely, among the virtual band numbers 5, 6, 3 included in the address map change information illustrated in FIG. 30, the virtual band number 3 exists in the address map information illustrated in FIG. 29, but the virtual band numbers 5 and 6 do not exist. Thus, the address map information management processor 430-2 newly allocates the virtual band numbers 5 and 6. As shown in FIG. 30, it can be seen that the virtual band number 5 in the address map change information corresponds to the logical band number 0, and the virtual band number 6 corresponds to the logical band number 2.

Thus, as shown in FIG. 31, the virtual band number 5 is newly allocated to the logical band number 0, and the virtual band number 6 is newly allocated to the logical band number 2.

In this manner, after reconfiguring the virtual bands, the address map information management processor 430-2 calculates an area of the disk 12 as a storage medium corresponding to a difference between a finally accessed virtual address in the virtual bands included in the address map change information and a finally accessed virtual address in the virtual bands included in the corresponding address map information.

In detail, regarding a virtual band of the virtual band number newly allocated to the address map information among the virtual band numbers included in the address map change information, the address map information management processor 430-2 calculates an area of the disk corresponding to a section starting from a virtual start address with respect to the corresponding virtual band to a finally accessed virtual address in the virtual band number included in the address map change information.

With reference to FIGS. 29 and 30, the address map information management processor 430-2 calculates an area of virtual addresses 0 to 13 in the virtual band number 5 to which a virtual band is newly allocated, and calculates an area of virtual addresses 0 to 8 in the virtual band number 6 according to the address map change information.

With respect to a virtual band included in the address map change information in which a virtual band number is not newly allocated to the address map information, the address map information management processor 430-2 calculates a disk area corresponding a section from an immediately next virtual address of a finally accessed virtual address read from the address map information to a finally accessed virtual address read from the address map change information.

With reference to FIGS. 29 and 30, in a virtual band 3 to which a virtual band is not newly allocated, the address map information management processor 430-2 calculates an area corresponding to a section starting from a next virtual address 102 of a finally accessed virtual address 101 of the virtual band number 3 read from the virtual map information to a finally accessed virtual address 106 with respect to the virtual band 3 read from the address map change information. Namely, a disk area corresponding to virtual addresses 102 to 106 of the virtual band address number 3.

The address map information management processor 430-2 controls the disk drive to read the LBAs written in the disk areas calculated as described above.

In detail, the address map information management processor 430-2 converts the virtual addresses with respect to the virtual bands calculated as described above into physical addresses of the disk, and controls the disk drive to access the disk according to the converted physical addresses. Namely, the address map information management processor 430-2 converts the virtual addresses into CHS (Cylinder Head Sector) information indicating a physical position of the disk and generates a voice coil motor driving control signal for accessing the disk based on the converted CHS (Cylinder Head Sector).

With reference to FIG. 4, when the generated voice coil motor driving control signal is applied to the VCM driving unit 440, the VCM driving unit 440 generates a voice coil motor driving current corresponding to the voice coil motor driving control signal and supplies the generated current to the voice coil motor 30. Accordingly, the magnetic head 16 is moved to a track position of the disk desired to be accessed.

And then, the address map information management processor 430-2 generates a control signal for reading logical block addresses from an area of the disk written without being reflected on the address map information.

Namely, under the control of the address map information management processor 430-2, LBAs may be read from the sector positions of the disk corresponding to the virtual addresses 0 to 13 of the virtual band number 5, the virtual addresses 0 to 8 of the virtual band number 6, and the virtual addresses 102 to 106 of the virtual band number 3.

The address map information management processor 430-2 adds the virtual address mapping information corresponding to the read logical block addresses to the address map information stored in the RAM 470.

Figures 32, 33:
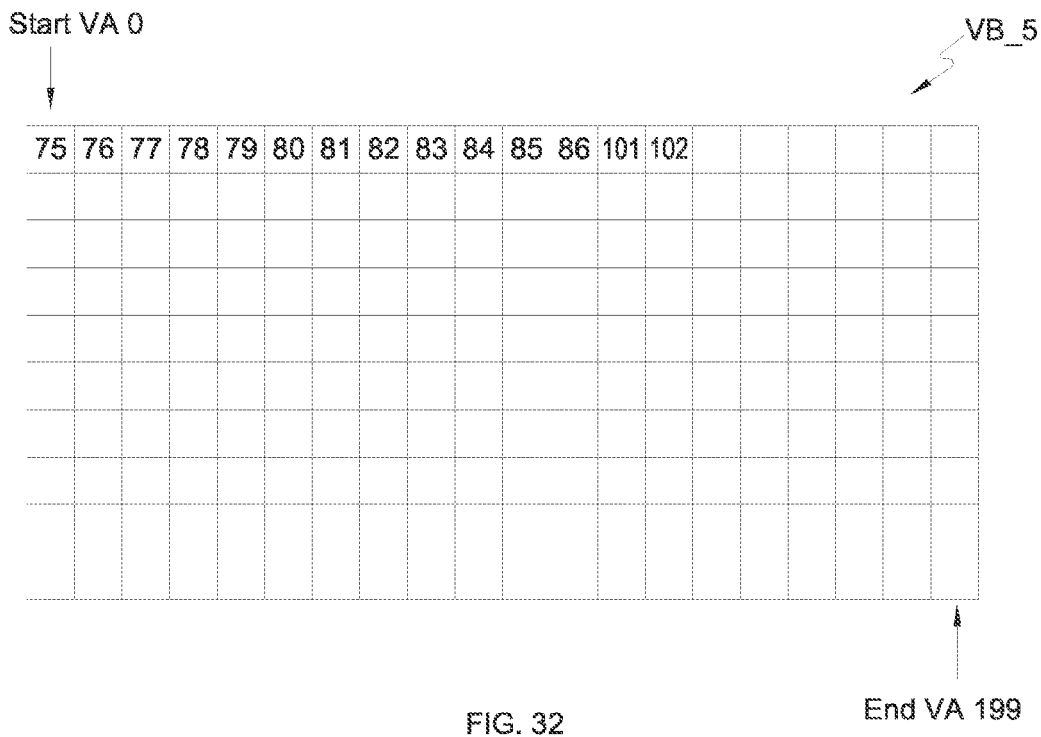
FIG. 32 is a view showing an LBA read from virtual addresses 0 to 13 of a virtual band number 5 to update address map information based on the address map change information illustrated in FIG. 30.
FIG. 33 is a view showing address map information with respect to the virtual band number 5 illustrated in FIG. 32.

For example, when the LBAs as shown in FIG. 32 is read from the sectors of the disk corresponding to the virtual addresses 0 to 13 of the virtual band number 5, VA mapping information corresponding to the LBAs as shown in FIG. 33 is generated and added to the address map information regarding the virtual band number 5 stored in the RAM 470. With reference to FIG. 33, LBAs 75 to 86 are mapped to 12 continuous sectors including VA 0 and LBAs 101 and 102 are mapped to two continuous sectors including VA 12.

Figure 34:
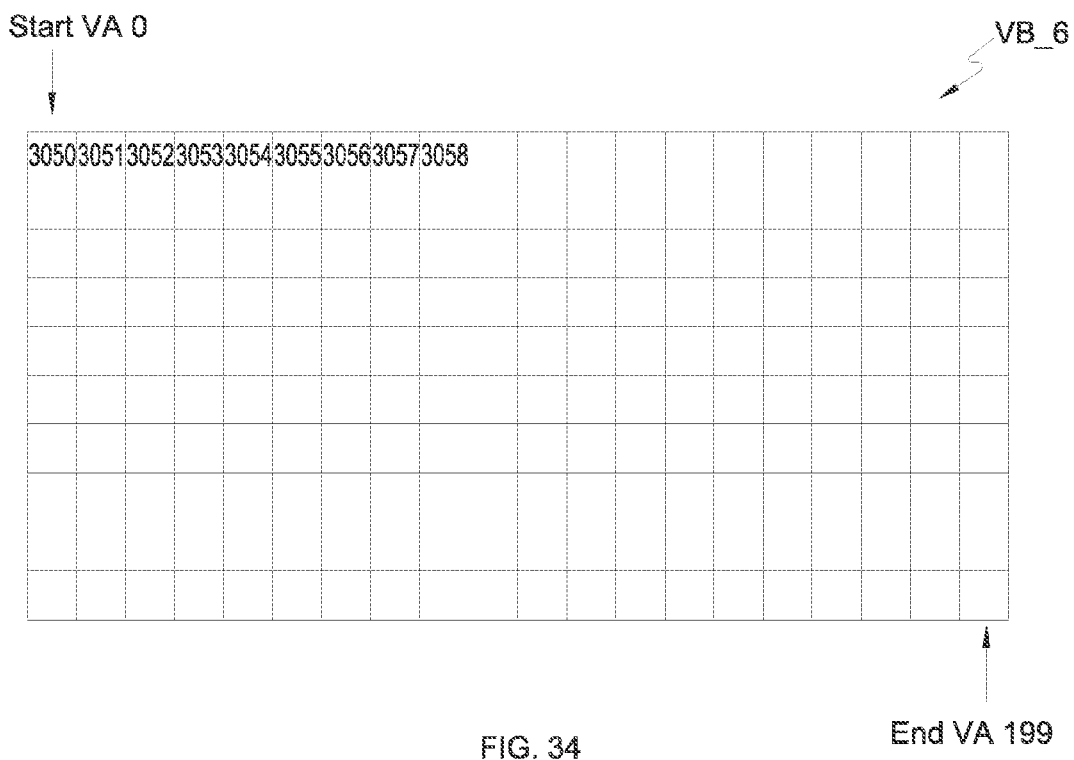
FIG. 34 is a view showing an LBA read from virtual addresses 0 to 9 of a virtual band number 6 to update address map information based on the address map change information illustrated in FIG. 30.
Figure 35:
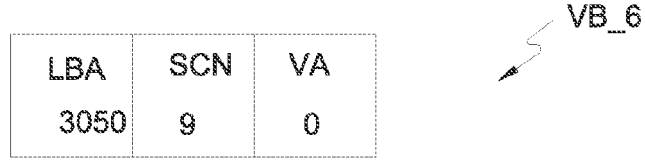
FIG. 35 is a view showing address map information with respect to virtual band number 6 illustrated in FIG. 34.

And, when the LBAs as shown in FIG. 34 are read from the sectors of the disk corresponding to the virtual addresses 0 to 6 of the virtual band number 6, the VA mapping information corresponding to the LBAs as shown in FIG. 35 are generated and added to address map information regarding the virtual band number 6 stored in the RAM 470. With reference to FIG. 35, LBAs 3050 to 3058 are mapped to nine continuous sectors including VA 0.

And then, when address map information as mapping information of the Vas corresponding to LBAs with respect to the virtual band number 3 loaded to the RAM 470 is as shown in FIG. 37, an allocation relationship of the LBAs to the Vas in the virtual band number 3 may be represented as shown In FIG. 36.

When LBAs read from sectors corresponding to virtual addresses 102 to 106 of the virtual band number 3 illustrated in FIG. 38 according to address map change information are 3511 to 3515, (3511, 5, 102) is added to the address map information including (LBA, SCN, VA) with respect to the virtual band number 3. Accordingly, the address map information as shown in FIG. 37 with respect to the virtual band number 3 loaded to the RAM 470 is updated to the address map information as shown in FIG. 39.

The address map information management processor 430-2 stores the updated address map information stored in the RAM 470 to the disk 12 or the nonvolatile memory device 490. And then, the address map information management processor 430-2 executes process of deleting the address map change information stored in the RAM 470 and the nonvolatile memory device 490.

In this manner, even when power is abnormally cut off, the address map information management processor 430-2 may restore the address map information by using the address map change information.

With reference back to FIG. 14, the address conversion processor 430-3 performs a process of converting an LBA designated by a received command into physical location information of the storage medium by using a virtual band and a virtual address. A detailed configuration of the address conversion processor 430-3 is illustrated in FIG. 15.

Figure 15:
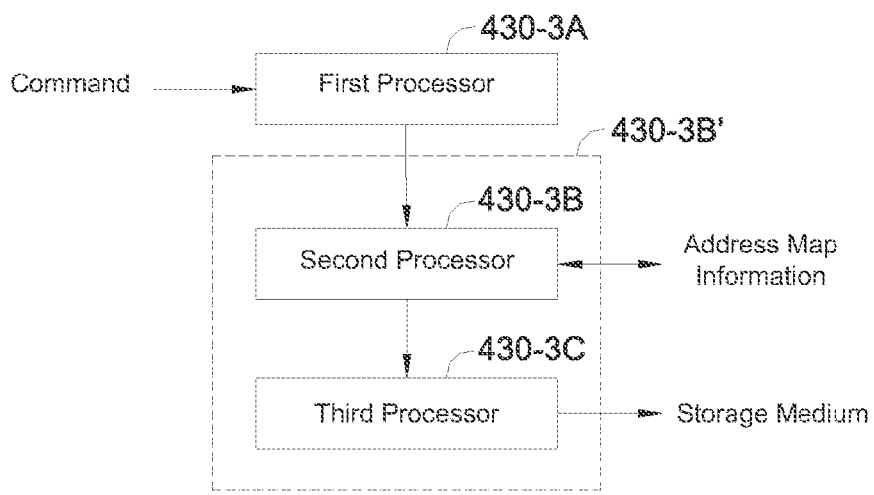
FIG. 15 is a view showing a detailed configuration of an address conversion processor illustrated in FIG. 14.

As shown in FIG. 15, the address conversion processor 430-3 may include a first processor 430-3A, a second processor 430-3B, and a third processor 430-3C. The second processor 430-3B and the third processor 430-3C may be designed to be integrated into a single processor 430-3B'. Obviously, though not shown in the drawings, the first processor 430-3A and the second processor 430-3B also may be designed to be integrated into a single processor.

The first processor 430-3A performs the operation of extracting an LBA designated by a received command.

The second processor 430-3B performs the operation of converting the LBA extracted by the first processor 430-3A into a virtual address. That is, the second processor 430-3B performs the operation of searching the mapping table 470-1 and converting the LBA into a virtual address.

The second processor 430-3B finds out virtual bands and virtual addresses corresponding to the LBA designated by a read command by using address map information stored in the RAM 470.

The second processor 430-3B allocates the virtual bands and the virtual addresses corresponding to the LBA designated by the write command as follows.

Figure 16:
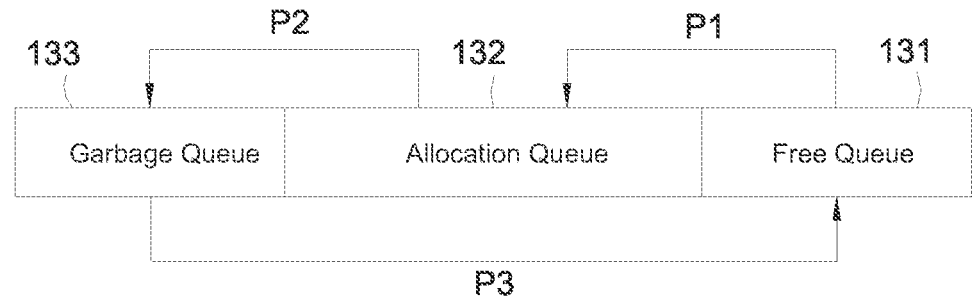
FIG. 16 is a view showing a detailed configuration of a second processor illustrated in FIG. 15.

As shown in FIG. 16, the second processor 430-33 may include a free queue 131, an allocation queue 132, and a garbage queue 133. The second processor 430-3B converts an LBA designated by a command into a virtual address by using the free queue 131, the allocation queue 132, and the garbage queue 133.

The second processor 430-3B stores information about the virtual bands not assigned to a logical band in the free queue 131 in an order complying with a prescribed rule. The free queue 131 is a means that stores information about virtual bands that can be allocated to a logical band in response to a command and is on standby for selection. The free queue 131 may store classified information about virtual bands that can be allocated to a logical band for each virtual zone or each physical zone.

The second processor 430-3B stores information about virtual bands allocated to a logical band in the allocation queue 132. Specifically, if the virtual bands allocated to a logical band including an LBA designated by a command do not exist in the mapping table 470-1 or all virtual addresses are already allocated and consumed for the virtual bands allocated to the logical band including the LBA designated by the command, the second processor 430-3B selects a virtual band on standby in the free queue 131, and allocates the virtual band to the logical band including the LBA designated by the command and moves it to the allocation queue 132.

Next, the second processor 430-3B allocates a virtual address corresponding to the LBA designated by the command based on the virtual band allocated to the logical band stored in the allocation queue 132. Concretely, if a new virtual address is allocated to the logical band including the LBA designated by the command and stored in the allocation queue 132, the second processor 430-3B allocates the newly allocated virtual address corresponding to the first sector of the logical band to the LBA designated by the command.

If a virtual band already allocated to the logical band including the LBA designated by the command exits in the allocation queue 132, the second processor 430-3B allocates a virtual address not allocated for the virtual band to the LBA designated by the command. For example, a virtual address of the sector right next to the last accessed sector in the virtual band can be allocated to the LBA designated by the command.

The second processor 430-3B selects a virtual band, whose number of virtual addresses invalidated because of data update exceeds a threshold value, from among the virtual bands allocated to the logical band, and moves it to the garbage queue 133 (P2).

For example, if the number of virtual bands stored in the free queue 131 is less than the initially set minimum value, the second processor 430-3B performs a garbage collection process. That is, the second processor 430-3B reads data stored in the sectors of valid virtual addresses from the virtual bands stored in the garbage queue 133, and executes rewriting to a newly allocated virtual address designated by a virtual band.

The second processor 430-3B moves information about the virtual band that has executed rewriting, among the virtual bands stored in the garbage queue 133, to the free queue 131 (P3).

Next, the third processor 430-3C controls the storage device to convert the virtual address converted in the second processor 430-3B into a physical address of the disk and access the storage medium in accordance with the converted physical address. That is, the third processor 430-3C generates a voice coil motor driving control signal for converting the virtual address into cylinder head sector (CHS) information representing the physical location of the disk and accessing the disk based on the converted CHS information.

Referring to FIG. 4, when the voice coil motor driving control signal generated by the third processor 430-3C is applied to the VCM driver 440, the VCM driver 440 generates a voice coil motor driving current corresponding to the voice coil motor driving control signal and supplies it to the voice coil motor 30. Therefore, the magnetic head 16 is moved to a track position of the disk desired to be accessed, and performs a data write or read operation corresponding to a command.

Figure 17:
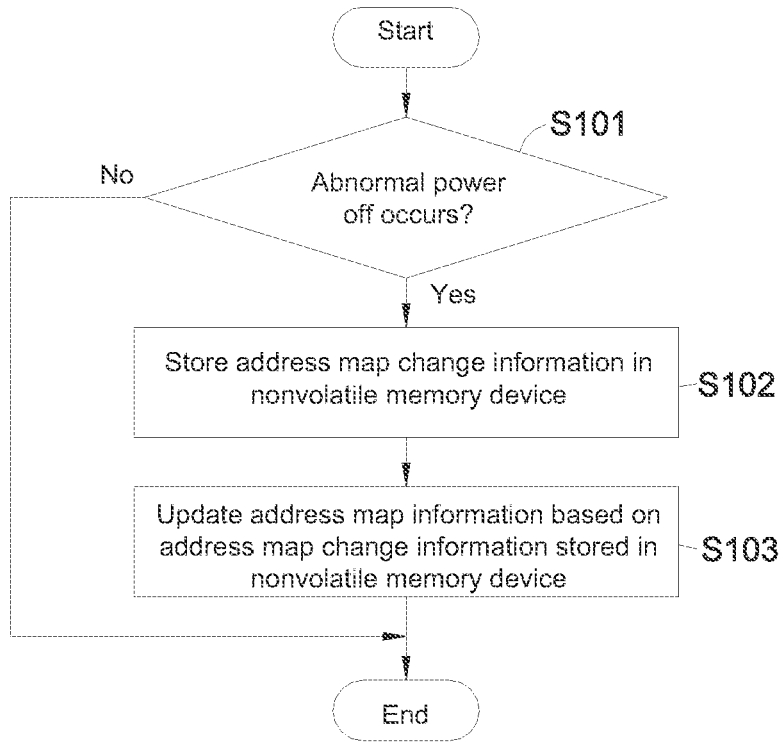
FIG. 17 is a flow chart illustrating a method for managing address map information according to an embodiment of a technical concept of the present invention.

Next, a storage medium accessing method according to an embodiment of the inventive concept executed under the control of the processor 110 shown in FIG. 1 or the processor 430 shown in FIG. 4 will be described with reference to the flow chart of FIG. 17.

Figure 18:
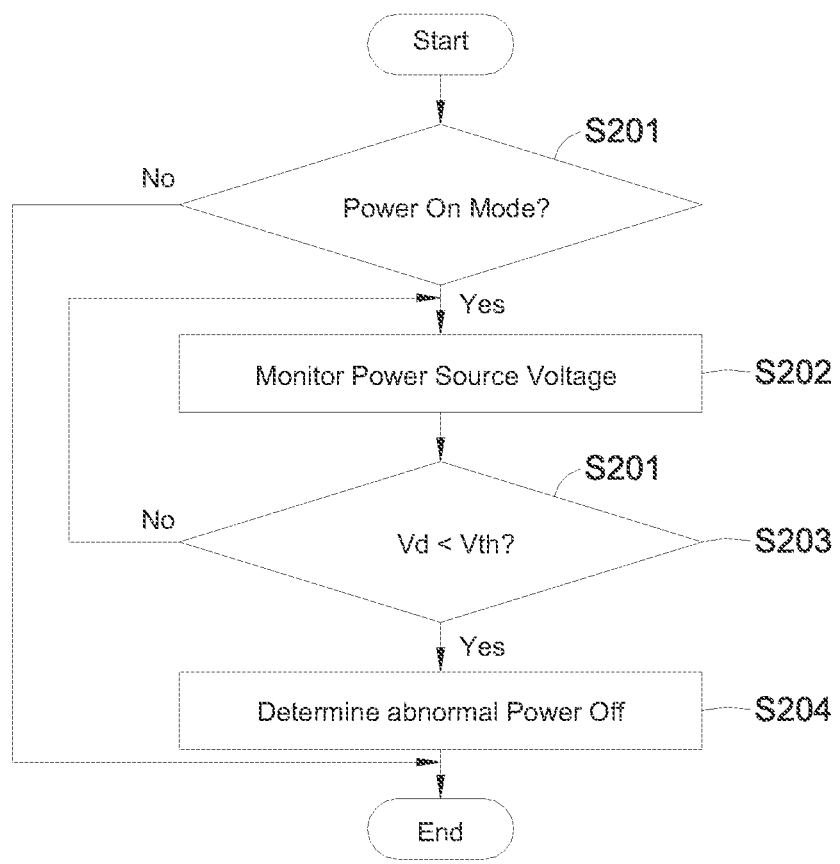
FIG. 18 is a detailed flow chart illustrating a process of determining a generation of abnormal power off illustrated in FIG. 17.

The processor 110 determines whether or not abnormal power off occurs in the storage device (S101). For example, when a power voltage is dropped to below a threshold value in a state in which a power off control signal is not generated, the processor 110 may determine that abnormal power off has occurred. A specific embodiment of determining abnormal power off is illustrated in FIG. 18.

A process of determining whether or not abnormal power off occurs will be described with reference to FIG. 18.

The processor 110 determines whether or not the storage device is in a power on mode (S201). The power on mode is a mode in which power is supplied to the storage device, and when once the storage device is changed to the power on mode, the power on mode is continuously maintained unless a command such as system termination, or the like, is generated. In the power on mode, a power off control signal is not generated unless a command such as system termination, or the like, is not generated.

The processor 110 monitors the voltage Vd of the power while the storage device is maintained in the power on mode (S202).

The processor 110 compares the voltage Vd of the monitored supply power and a threshold voltage Vth (S203). Here, the threshold voltage Vth may be set as a value obtained by adding a marginal voltage to a minimum voltage with which the processor 110 is normally operated. Obviously, the threshold voltage Vth is set to be lower than a normal power voltage.

When the monitored power voltage Vd is lower than the threshold voltage Vth, the processor 110 determines an abnormal power off state (S204).

In this manner, a state in which power is abnormally turned off can be determined.

With reference back to FIG. 17, when abnormal power off occurs according to the determination results in step S101, the processor 110 stores the address map change information generated in the storage device in the nonvolatile storage device 170 by using reserved power (S102). Here, the address map change information is generated whenever a write command is executed and stored in the RAM 130 as a volatile storage device. The address map change information is information related to a position of data written in the storage medium 150 without being reflected in the address map information stored in the storage medium 150 or the nonvolatile memory device 170. The address map change information 470-2 may be configured to include a logical band number, a virtual band number, and information regarding a finally accessed virtual address. Namely, the address map change information may be configured by a logical band number with respect to data written to the storage medium 150 without being reflected on the address map information stored in the storage medium 150 or the nonvolatile memory device 170, a virtual band number VB NO allocated to a corresponding logical band, and a virtual address LA VA finally accessed in a virtual band allocated to the corresponding logical band. For example, the address map change information may be generated in the manner as described above with reference to FIGS. 29A, 29B, and 31.

Next, when power is supplied to the storage device again, the processor 110 performs of processing to update address map information stored in the storage medium 150 or the nonvolatile memory device 170 based on the address map change information stored in the nonvolatile memory device 170 (S103).

A process of reconfiguring the VA mapping information corresponding to the LBAs in the address map information will be described in detail with reference to FIG. 21.

It is determined whether or not the storage device is in a power on mode in which power is supplied (S301). Namely, the processor 110 determines whether or not the storage device transitions to a power on state from a power off state.

When the storage device transitions to a power on state according to the determination results in step S301, the processor 110 reads address map information from the storage medium 150 or the nonvolatile memory device 170 and stores it in the RAM 130 (S302).

Next, the processor 110 determines whether or not the address map change information has been stored in the nonvolatile memory device 170 (S303). When the storage device is abnormally turned off before transitioning to the power on state, the address map change information may be stored in the nonvolatile memory device 170. If the storage device is normally turned off according to a power off control signal without experiencing an abnormal power off occurrence before transitioning to the power on state, the address map change information is not stored in the nonvolatile memory device 170.

When the address map change information is stored in the nonvolatile memory device 170 according to the determination results in step S303, the processor 110 reads the address map change information and the address map information (S304). Namely, the processor 110 reads the address map change information from the nonvolatile memory device 170 and stores it in the RAM 130.

Next, the processor 110 performs a process of reconfiguring the address map information (S305). Namely, the processor 110 performs a process of adding mapping information regarding a position of data written on the storage medium 150 without being reflected on the address map information stored in the storage medium 150 or the nonvolatile memory device 170 to the address map information based on the address map change information.

The process of reconfiguring the address map information in step S305 will be described in detail with reference to FIG. 20.

First, the processor 110 performs a process of reconfiguring a virtual band mapped to a logical band in the address map information based on the address map change information (S401). In detail, the processor 110 newly allocates a virtual band number not present in the address map information among virtual band numbers included in the address map change information to the address map information. For example, it is assumed that address map information indicating an allocation relationship between the logical bands and the virtual bands is as shown in FIG. 29 and the address map change information is as shown in FIG. 30. Then, among the virtual band numbers 5, 6, 3 included in the address map change information illustrated in FIG. 30, the virtual band number 3 exists in the address map information illustrated in FIG. 29 but the virtual band numbers 5 and 6 do not exist. Thus, the processor 110 newly allocates the virtual band numbers 5 and 6.

Next, the processor 110 performs a process of reconfiguring VA mapping information corresponding to the LBAs in the address map information based on the address map change information (S402). Namely, the processor 110 performs a process of adding the mapping information of the VAs and LBAs corresponding to the written sectors in the storage medium 150 without being reflected on the address map information to the address map information.

A process of reconfiguring the VA mapping information corresponding to the LBAs in the address map information will be described in detail.

The processor 110 calculates a storage area of data written in the storage medium 150 without being reflected on the address map information (S501). Namely, the processor 110 calculates an area of the storage medium corresponding to a difference between a finally accessed virtual address in the virtual band included in the address map change information and a finally accessed virtual address in the virtual band included in the corresponding address map information.

In detail, regarding a virtual band of the virtual band number newly allocated to the address map information among the virtual band numbers included in the address map change information, the processor 110 calculates an area of the disk corresponding to a section starting from a virtual start address with respect to the corresponding virtual band to a finally accessed virtual address in the virtual band number included in the address map change information.

With respect to a virtual band included in the address map change information in which a virtual band number is not newly allocated to the address map information, the processor 110 calculates a disk area corresponding a section from an immediately next virtual address of a finally accessed virtual address read from the address map information to a finally accessed virtual address read from the address map change information.

Next, the processor 110 reads LBAs from the data storage area calculated in step S501 (S502). Namely, the processor 110 reads LBAs from the sectors of the area of the storage medium 150 written without being reflected on the address map information. As described above, data and corresponding LBAs are written in each sector of the storage medium 150 when a write operation is performed.

Next, the VA mapping information corresponding to the LBAs read in step S502 is added to the address map information (S503). For example, For example, when the LBAs as shown in FIG. 32 is read from the sectors of the storage medium 150 corresponding to the virtual addresses 0 to 13 of the virtual band number 5 in step S502, the processor 110 generates VA mapping information corresponding to the LBAs as shown in FIG. 33 and adds it to the address map information regarding the virtual band number 5 stored in the RAM 130. With reference to FIG. 33, LBAs 75 to 86 are mapped to 12 continuous sectors including VA 0 and LBAs 101 and 102 are mapped to two continuous sectors including VA 12.

Figure 19:
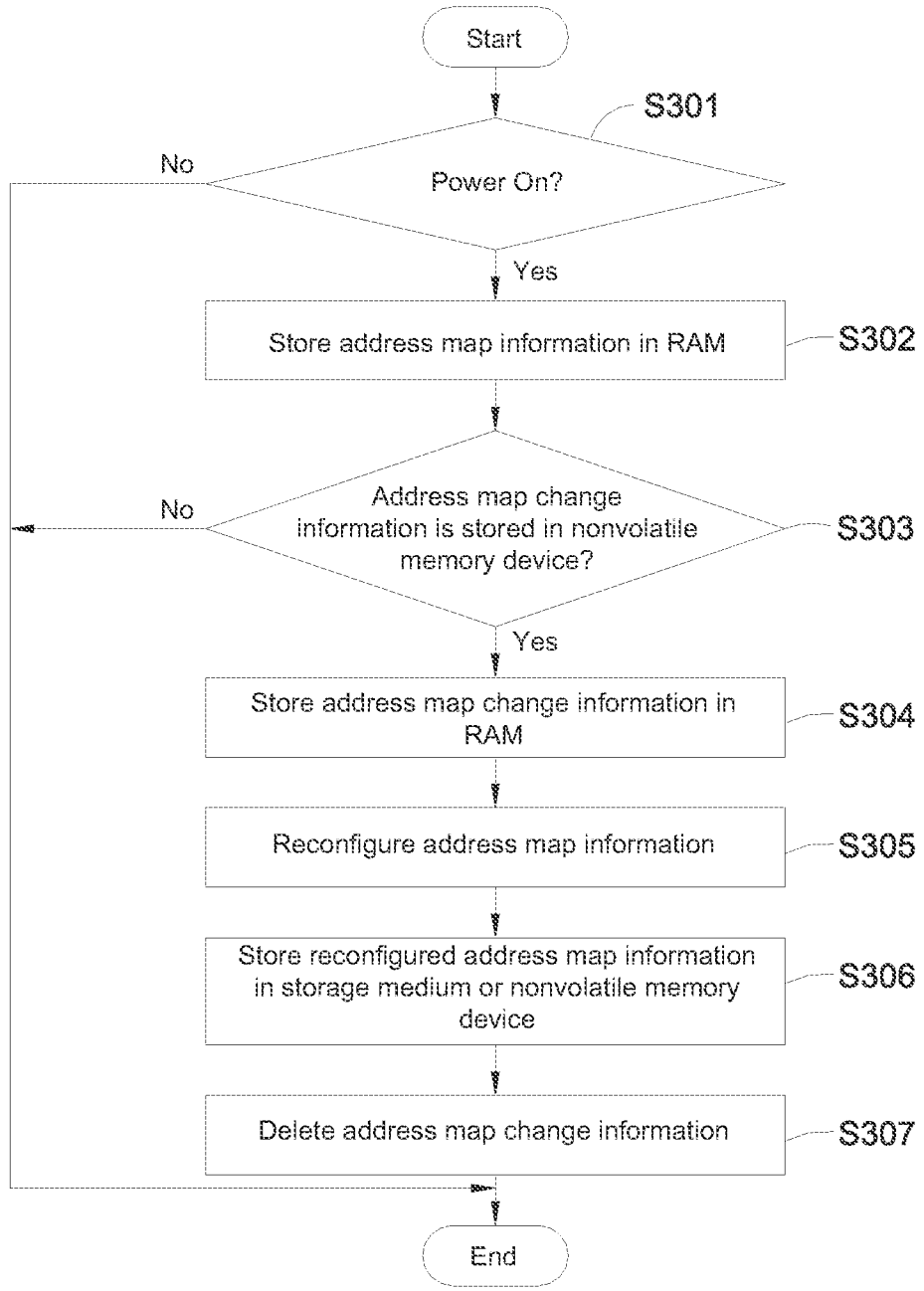
FIG. 19 is a detailed flow chart of a process of updating address map information illustrated in FIG. 17.
Figure 20:
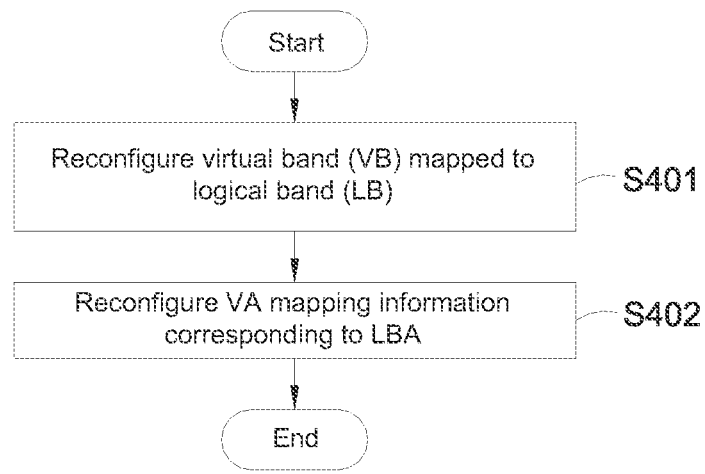
FIG. 20 is a detailed flow chart of a process of reconfiguring address map information illustrated in FIG. 19.
Figure 21:
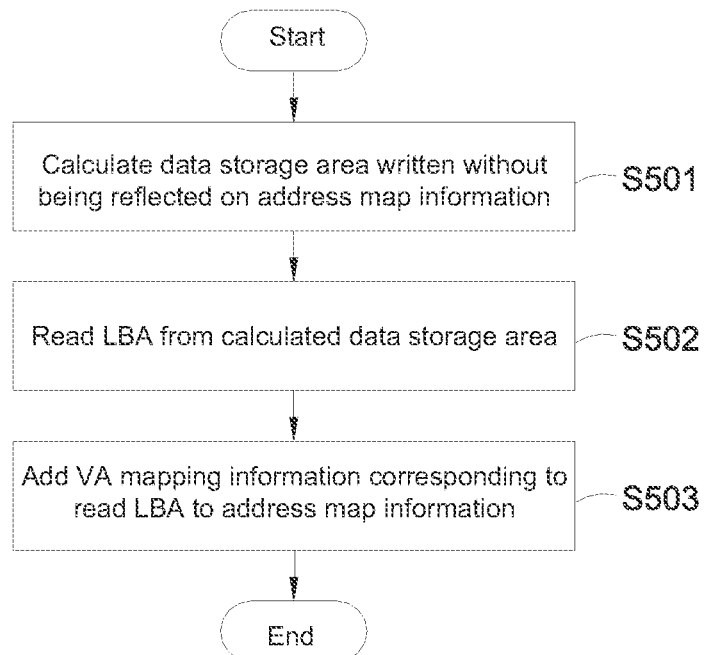
FIG. 21 is a detailed flow chart of a process of reconfiguring VAs mapping information corresponding to LBAs illustrated in FIG. 20.

Through the operation according to the flow charts of FIGS. 20 and 21 as described above, the step S305 of reconfiguring the address map information illustrated in FIG. 19 may be performed.

With reference back to FIG. 19, after reconfiguring the address map information in step S305, the processor 110 stores the reconfigured address map information in the storage medium 150 or the nonvolatile memory device 170 (S306).

And then, the processor 110 deletes the address map change information stored in the RAM 130 and the nonvolatile memory device 170 (S307). Namely, the processor 110 performs an operation of deleting the address map change information stored in the RAM 130 and the nonvolatile memory device 170.

Through such an operation, the address map information can be updated based on the address map change information.

Figure 22:
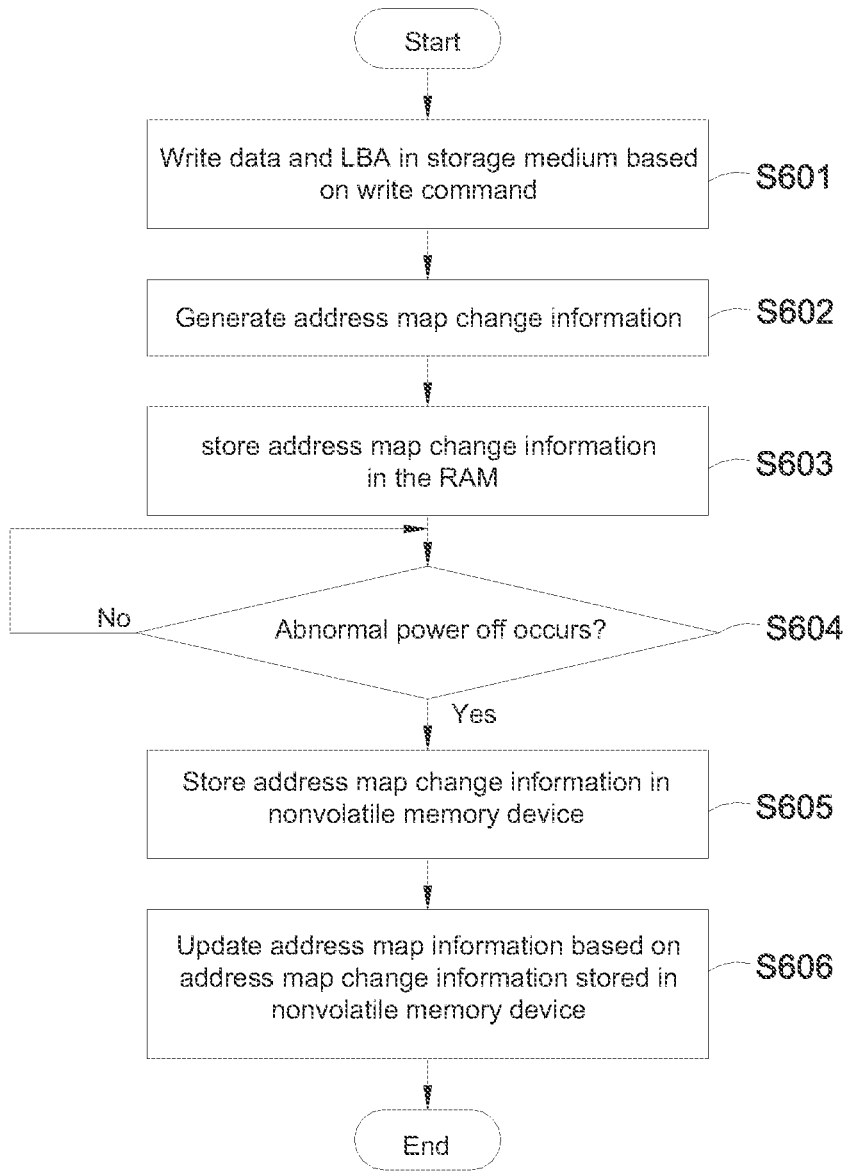
FIG. 22 is a flow chart of an access method in a disk drive according to an embodiment of a technical concept of the present invention.

Next, an access method in a disk drive according to an embodiment of the present invention executed under the control of the processor 430 will be descried with reference to FIG. 22.

The processor 430 controls the disk drive to write data and LBAs on the disk 12 based on a write command received through the host interface 480 (S601). Namely, the processor 430 converts the LBAs designated by the write command into physical addresses of the disk 12 by using the address map information stored in the RAM 470 and write the data and the LBAs in sectors corresponding to the converted physical addresses.

Figure 23:
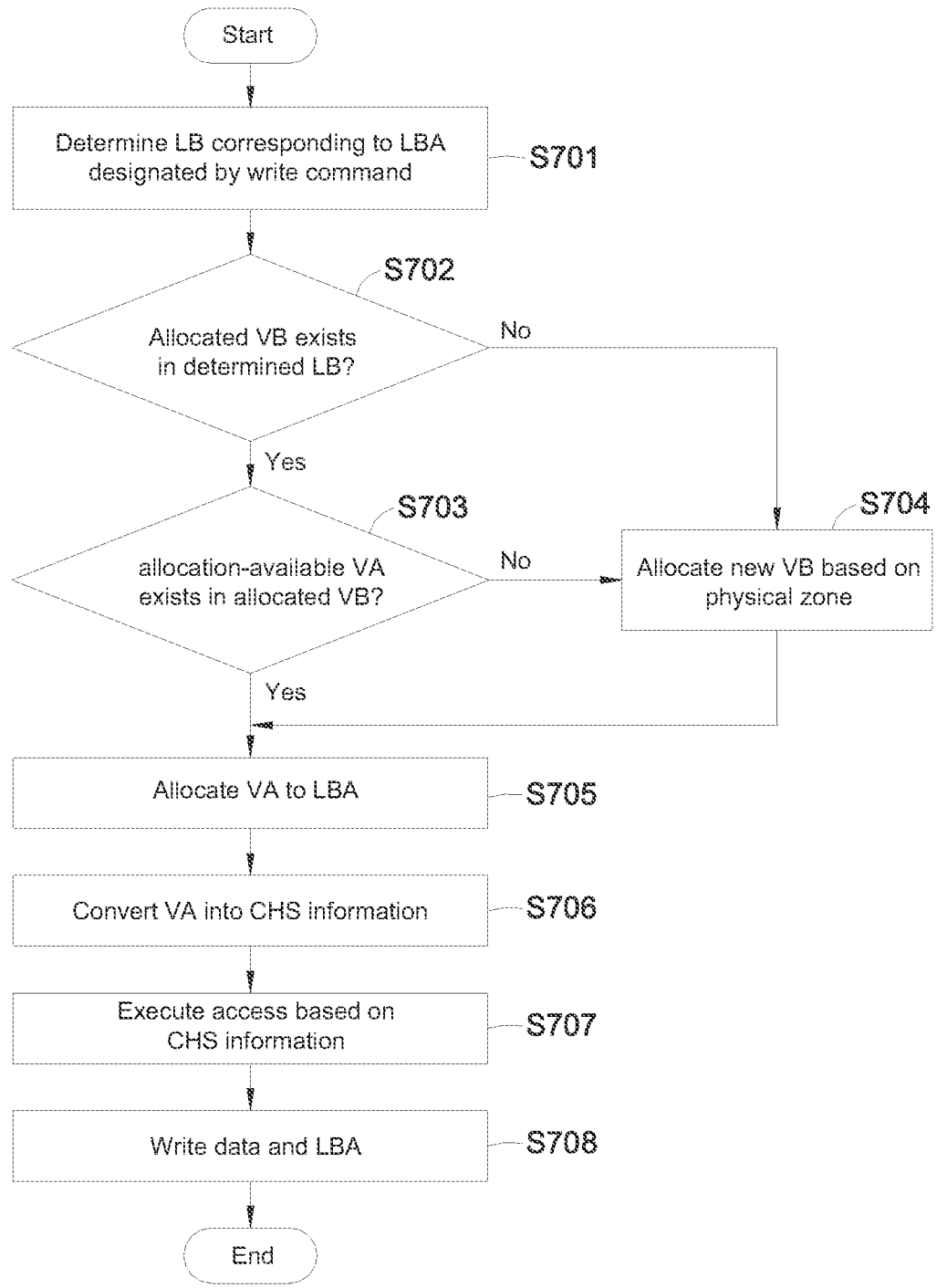
FIG. 23 is a detailed flow chart of a write process illustrated in FIG. 22.

An operation of performing a write process will be described in detail with reference to the flow chart illustrated in FIG. 23.

The processor 430 determines a logical band (LB) corresponding to LBAs designated by a received write command (S701). In detail, the processor 430 determines a logical band corresponding to the LBAs designated by the write command received as logical band numbers including LBAs designated by the received write command. For example, when a logical band number 0 is allocated to LBAs 0 to 999 and LBAs designated by a write command is 75, a logical band corresponding to the LBAs designated by the write command is determined to be a logical band number 0.

The processor 430 determines whether or not a virtual band allocated to the logical band determined in step S701 exists (S702). In detail, the processor 430 searches the address map information 470-1 stored in the RAM 470 and determines whether or not a virtual band allocated to the determined logical bands already exists in step S701.

When there is a virtual band allocated to the logical band determined in step S701 according to the determination results in step S702, the processor 430 determines whether or not allocation-available virtual addresses VAs exist in the allocated virtual band (S703). Namely, the processor 430 determines whether or not virtual addresses that can be allocated in the allocated virtual band have been all used up. When a finally accessed virtual address in the allocated virtual band is a virtual address corresponding to a final sector included in the virtual band, the processor 430 determines that all the virtual addresses have been used up. For example, in a state in which the size of the virtual band is set to have 200 sectors and start virtual addresses are set to be 0 to 199, when a finally accessed virtual address is 199, the processor 430 may determine that the virtual addresses in the corresponding virtual band have been all used up.

When there is no virtual band allocated to the logical band determined in step S701 according to the determination results in step S702 or when there is no virtual address which can be allocated to the allocated virtual band, the processor 430 allocates a new virtual band to the logical band determined in step S701 based on a physical zone (S704). Namely, among virtual bands included in a physical zone corresponding to the logical zone including the LBAs designated by the command, the processor 430 may allocate a virtual band not allocated to a different logical band to the logical band including the LBAs designated by the command.

Next, the processor 430 allocates virtual addresses Vas corresponding to the LBAs designated by the command based on the allocated virtual band (S705). In detail, when a new virtual address is allocated in step S705, the processor 430 may allocate a start virtual address indicating a first virtual sector which has been newly allocated to the LBA designated by the command. When there are virtual addresses that can be allocated to the LBAs in the virtual band already allocated to the logical band, the processor 430 may allocate a next virtual address subsequent to the finally accessed virtual address to the LBA designated by the command.

Next, the processor 430 converts the virtual addresses allocated in step S705 into CHS (Cylinder Head Sector) information corresponding to physical access position information of the disk 12 (S706).

Next, the processor 430 executes a seek operation based on the CHS information corresponding to the physical access position information converted in step S706 (S707). In detail, the processor 430 generates a voice coil motor driving control signal for moving the magnetic head 16 to a target track position of the disk 12 according to the converted CHS information. With reference to FIG. 4, when the generated voice coil motor driving control signal is applied to the VCM driving unit 440, the VCM driving unit 440 generates a voice coil motor driving current corresponding to the voice coil motor driving control signal and supplies the same to the voice coil motor 30. Accordingly, the magnetic head 16 is moved to the track and sector position of the disk desired to be accessed.

After finishing the seek operation in step S707, the processor 430 performs an operation of writing data and LBAs in the sector position corresponding to the Vas of the disk (S708). As described above, the processor 430 controls the disk drive to write data in the data storage region of the sector and write LBAs in a spare area of the sector.

According to this operation, the write process is performed in the disk drive.

With reference back to FIG. 22, after the write process is performed in step S601, the processor 430 generates address map change information (S602). The address map change information is information related to a position of data written in the disk 12 without being reflected on the address map information stored in the disk 12 or the nonvolatile memory device 490. The address map change information may be configured to include information regarding a logical band number, a virtual band number, and a finally accessed virtual address. Namely, the address map change information may be configured to include a logical band number LB NO, a virtual band number VB NO allocated to the corresponding logical band, and a finally accessed virtual address LA VA in the virtual band allocated to the corresponding logical band, which are written in the disk 12 without being reflected on the address map information stored in the disk 12 or the nonvolatile memory device 490.

For example, after the address map information including the logical bands and the virtual bands as illustrated in FIG. 28A are stored to the RAM 470 from the disk 12 or the nonvolatile memory device 490, when it is changed to the address map information including the logical bands and virtual bands as shown in FIG. 28B according to performing of a write command, the address map change information may be generated in the form as shown in FIG. 30.

The processor 430 stores the address map change information generated in step S602 in the RAM470 (S603).

After performing the step S603, the processor 430 determines whether or not abnormal power off occurs in the disk drive while waiting for receiving a next command (S604). When the voltage of power applied to the disk drive is dropped to below a threshold voltage in a state in which a power off control signal is not generated, the processor 430 determines that abnormal power off has occurred. Namely, when the voltage of power output from the power supply device 500 is dropped to below the threshold voltage in a power on mode, the processor 430 determines that abnormal power off has occurred.

When abnormal power off has occurred in the disk drive according to the determination results in step S604, the processor 430 reads the address map change information stored in the RAM 470 and stores it in the nonvolatile memory device 490 by using reserved power (S605).

After the abnormal power off occurs in the disk drive, when power is normally supplied to the disk drive again, the processor 430 updates the address map information stored in the disk 12 or the nonvolatile memory device 490 of the disk drive based on the address map change information stored in the nonvolatile memory device 490 (S606). The method of updating address map information based on the address map change information has been described in detail with reference to FIGS. 20 and 21, so a repetitive description thereof will be omitted.

Figure 24:
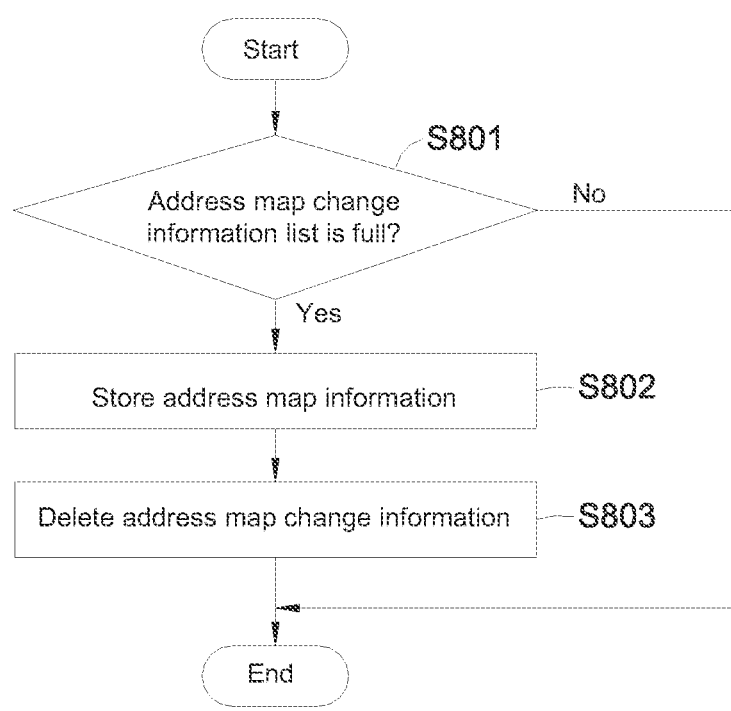
FIG. 24 is a flow chart illustrating a method for managing address map information according to another embodiment of a technical concept of the present invention.

Next, a method for managing address map information according to another embodiment of the technical concept of the present invention executed under the control of the processor 110 illustrated in FIG. 1 or the processor 430 illustrated in FIG. 4 will be described with reference to the flow chart of FIG. 24.

The processor 110 determines whether or not the address map change information is stored in a full state in an address map change information list allocated to the RAM 130 (S801). Here, the full state refers to a state in which address map change information cannot be added to the address map change information list any further. For reference, three address map change information items including (LBNO, VB NO, and LA VA) are proposed in FIG. 30. In case in which the size of the address map change information list is designed to store ten address map change information items, when ten address map change information items are stored in the address map change information list, it becomes a full state. The size of the address map change information may be determined within a size in which the address map change information can be stored in the nonvolatile storage device 170 by reserved power when power is abnormally cut off.

When the address map change information stored in the RAM 130 reaches a full state according to the determination results in step S801, the processor 110 stores the address map information stored in the RAM 130 to the storage medium 150 or the nonvolatile memory device 170 (S802). When the storage device is a disk drive, the storage medium 150 may be a disk.

After performing step S802, the processor 430 deletes the address map change information stored in the RAM 130 (S803).

A method of managing address map information through a network according to an embodiment of the technical concept of the present invention will be described.

First, a network system performing a method for managing address map information regarding a storage device through a network will be described with reference to FIG. 40.

Figure 40:
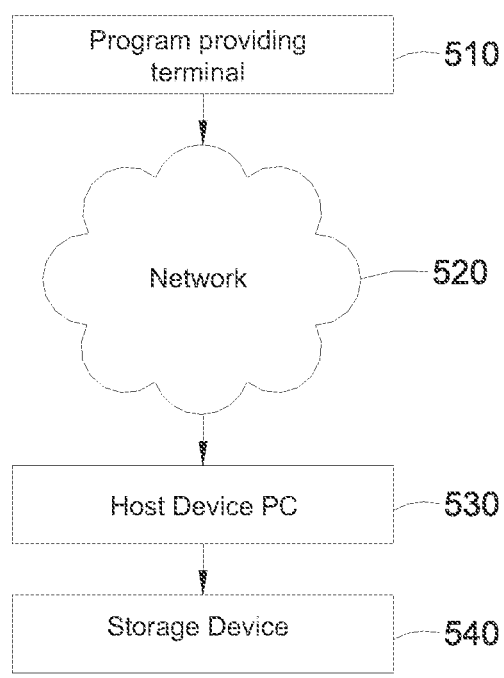
FIG. 40 is a view showing a network configuration for explaining a method for managing address map information through a network according to an embodiment of a technical concept of the present invention.

As shown in FIG. 40, the network system according to an embodiment of the technical concept of the present invention includes a program providing terminal 510, a network 520, a host PC 530, and a storage device 540.

The network 520 may be implemented as a communication network such as the Internet. Obviously, the network 520 may be implemented as a wireless communication network as well as as a wire communication network.

The program providing terminal 510 stores a program for managing address map information according to the technical concept of the present invention illustrated in FIGS. 17 to 24.

The program providing terminal 510 performs a process of transmitting a program for managing address map information according to a program transmission request from the host PC 530 connected through the network 520.

The host PC 530 includes hardware and software for performing accessing the program providing terminal 510 through the network 520, requesting a transmission of a program for managing address map information, and downloading the requested program for managing address map information from the program providing terminal 510.

The host PC 530 may execute the method for managing address map information according to the technical concept of the present invention in the storage device 540 based on the flow charts illustrated in FIGS. 17 to 24 according to the program for managing address map information downloaded from the program providing terminal 510.

A method for managing address map information through a network according to an embodiment of the technical concept of the present invention will be described with reference to the flow chart of FIG. 41.

First, the host PC 530 using the storage device 540 such as a disk drive, or the like, accesses the program providing terminal 510 through the network 520 (S901). After accessing the program providing terminal 510, the host PC 530 transmits information requesting a transmission of the program for managing an address map information to the program providing terminal 510 (S902).

Then, the program providing terminal 510 transmits the requested program for managing address map information to the host PC 530, so that the host PC 530 can download the program for managing address map information (S903).

And then, the host PC 530 processes to execute the downloaded program for managing address map information in the storage device (S904). By executing the program for managing address map information in the storage device, when abnormal power off occurs in the storage device, the address map change information is stored in the nonvolatile memory device by using reserved power and address map information regarding the storage device may be updated by using the address map change information stored in the nonvolatile memory device.

One embodiment may be a method for managing address map information, the method comprising: when abnormal power off occurs in a storage device, storing address map change information generated in the storage device in a nonvolatile memory device; and when power is applied to the storage device, updating address map information with respect to the storage device based on the address map change information stored in the nonvolatile memory device. An embodiment may also include wherein the address map information includes information for converting a logical block address received from a host device into a physical address of a storage medium. An embodiment may also include wherein the address map information includes information for converting a logical block address received from a host device into a physical address of a storage medium by using a virtual address. An embodiment may also include wherein the address map information includes information for converting a logical block address received from a host device into a physical address of a storage medium such that it is sequentially written in one direction in a virtual band corresponding to a physical area of the storage medium. An embodiment may also include wherein the address map information includes mapping information between a logical band classified as an aggregate of logical block addresses and a virtual band corresponding to a physical area of a storage medium and mapping information between a logical block address in a virtual band allocated to a logical band and a virtual address. An embodiment may also include wherein the address map change information includes information regarding a position of data written without being reflected in the address map information. An embodiment may also include wherein the address map change information includes a logical band number, a virtual band number, and a finally accessed virtual address. An embodiment may also include wherein the address map change information includes a logical band number with respect to data written without being reflected in the address map information, a virtual band number allocated to the logical band, and a virtual address finally accessed in the virtual band allocated to the logical band. An embodiment may also include wherein when a power source voltage is dropped to below a threshold voltage in a state in which power off control signal is not generated in the storage device, it is determined that abnormal power off has occurred. An embodiment may also include wherein the nonvolatile memory device includes a nonvolatile semiconductor memory device. The nonvolatile semiconductor memory device can include a NAND flash memory device or a NOR flash memory device. An embodiment may also include wherein the address map change information generated in the storage device is stored in a volatile memory device while power is being normally supplied. An embodiment may also include wherein, in the updating of the address map information, the address map information is reconfigured based on a logical block address read from an area in which data and a corresponding logical block address are written without being reflected in the address map information by using the address map change information stored in the nonvolatile memory device. An embodiment may also include wherein the updating of the address map information comprises: reading the address map information and the address map change information when power is applied to the storage device; reconfiguring the address map information based on the address map change information; and storing the reconfigured address map information in the storage device. The address map information may be read from the nonvolatile memory device or the storage medium constituting the storage device, and the address map change information may be read from the nonvolatile memory device. An embodiment may also include wherein the reconfiguring of the address map information comprises: newly allocating a virtual band number not present in the address map information among virtual band numbers included in the address map change information to the address map information; reading a logical block address from an area of the storage medium corresponding to a difference between a virtual address finally accessed in the virtual band included in the address map change information and a virtual address finally accessed in a virtual band included in the address map information corresponding thereto; and adding mapping information of the virtual address corresponding to the read logical block address to the address map information.

An embodiment may also include wherein, in the reading of the logical block address, the logical block address is read from an area of the storage medium corresponding to a section starting from a start virtual address with respect to the virtual band of the newly allocated virtual band number to a finally accessed virtual address in the virtual band number included in the address map change information. An embodiment may also include wherein, in the reading of the logical block address, regarding a virtual band included in the address map change information to which the virtual band number is not newly allocated, the logical block address is read from an area of the storage medium corresponding to a section starting from an immediately next virtual address of the finally accessed virtual address read from the address map information to the finally accessed virtual address read from the address map change information. An embodiment may also include wherein the logical block address is read from a logical block address storage area allocated to the storage medium. An embodiment may also include wherein the logical block address storage area is allocated in units of areas designated by a physical address. An embodiment may also include wherein the physical address is allocated in units of sectors. An embodiment may also include wherein a logical block address corresponding to data written in a sector area while a write operation is being performed is written in the logical block address storage area.

An embodiment may also include wherein the address map information is stored in the nonvolatile memory device or the storage medium of the storage device. An embodiment may also include wherein the storage device includes a disk drive, and the address map information is stored in a disk of the disk drive.

An embodiment may also include deleting the address map change information stored in the nonvolatile memory device after the address map information is updated. An embodiment may also include wherein when abnormal power off occurs in the storage device, the address map change information stored in the volatile memory device is read by using reserved power and stored in the nonvolatile memory device. An embodiment may also include wherein the reserved power includes power supplied by a voltage charged by a charging element.

An embodiment may also include further comprising: when the address map change information is stored in a full state in an initially set address map change information list, reading the address map information stored in the volatile memory device and storing the read address map information in the nonvolatile memory device of the storage medium of the storage device; and deleting the address map change information stored in the volatile memory device after the address map information is stored in the nonvolatile memory device of the storage medium of the storage device, wherein the address map information regarding the storage device is stored in the volatile memory device when the storage device is initialized, and the address map information stored in the volatile memory device is updated whenever the address map change information is generated.

Another embodiment may be an access method in a disk drive, the method comprising: converting a logical block address designated in a command into a physical address of a disk based on address map information; accessing the converted physical address position of the disk and executing a data write operation; generating address map change information based on the data write operation; and when abnormal power off occurs in a disk drive, storing the generated address map change information in a nonvolatile memory device, wherein when power is applied to the disk drive, a process of updating the address map information is executed based on the address map change information stored in the nonvolatile memory device. An embodiment may also include wherein when the disk drive is initialized, the address map information is read from the disk and stored in a volatile memory device, and the logical block address designated in the command is converted into a physical address of the disk based on the address map information stored in the volatile memory device. An embodiment may also include wherein the address map information is stored in the disk or the nonvolatile memory device. An embodiment may also include wherein the address map information includes information for converting a logical block address received from a host device into a physical address of the disk by using a virtual address. An embodiment may also include wherein the address map information includes information for converting a logical block address received from the host device into a physical address of the disk such that it is sequentially written in any one direction of an inner circumferential direction and an outer circumferential direction in a track included in a virtual band corresponding to a physical area of the disk. An embodiment may also include wherein the address map information includes mapping information between a logical band classified as an aggregate of logical block addresses and a virtual band corresponding to a physical area of the disk and mapping information between a logical block address in a virtual band allocated to a logical band and a virtual address corresponding to a sector. An embodiment may also include wherein data and a logical block address corresponding thereto are written to the disk when the data write operation is executed. An embodiment may also include wherein the logical block address is written by data sector of the disk. An embodiment may also include wherein when a voltage of a power source applied from the disk drive is dropped to below a threshold voltage in a state in which power off control signal is not generated in the disk drive, it is determined that abnormal power off has occurred. An embodiment may also include wherein the address map change information includes information regarding a position of data written in the disk without being reflected in the address map information stored in the disk or the nonvolatile memory device. An embodiment may also include wherein the address map change information includes a logical band number, a virtual band number, and a finally accessed virtual address. An embodiment may also include wherein the address map change information includes a logical band number with respect to data written in the disk without being reflected in the address map information stored in the disk or the nonvolatile memory device, a virtual band number allocated to the logical band, and a virtual address finally accessed in the virtual band allocated to the logical band. An embodiment may also include wherein a process of updating the address map information comprises: reading the address map information and the address map change information when power is applied to the disk drive; reconfiguring the address map information based on the address map change information; and storing the reconfigured address map information in the disk drive. An embodiment may also include wherein, in the reconfiguring of the address map information, a virtual band number not present in the address map information among virtual band numbers included in the address map change information is newly allocated to the address map information based on the address map change information. An embodiment may also include wherein the updating of the address map information comprises: moving a magnetic head to a first area of the disk in which data and a logical block address corresponding thereto are written without being reflected in the address map information by using the address map change information; reading the logical block address from the first area; and adding virtual address mapping information corresponding to the logical block address read from the first area to the address map information.

An embodiment may also include wherein the first area of the disk is determined based on a difference between a finally access virtual address in a virtual band included in the address map change information and a finally accessed virtual address in a virtual band included in the address map information corresponding thereto. An embodiment may also include wherein the first area includes an area of the disk corresponding to a section starting from a start virtual address with respect to the virtual band of the newly allocated virtual band number based on the address map change information to a finally accessed virtual address in the virtual band number included in the address map change information. An embodiment may also include wherein, regarding a virtual band included in the address map change information to which the virtual band number is not newly allocated, the first area includes an area of the disk corresponding to a section starting from an immediately next virtual address of the finally accessed virtual address read from the address map information to the finally accessed virtual address read from the address map change information. An embodiment may also include wherein the process of updating the address map information further comprises: deleting the address map change information stored in the nonvolatile memory device after the step of executing the reconfigured address map information in the disk drive is executed.

Another embodiment may be a storage device comprising: a storage medium; a storage media interface accessing the storage medium to write data or read data, a volatile memory device; a nonvolatile memory device; and a processor controlling the storage medium interface to write data to the storage medium or read data from the storage medium, wherein the processor stores address map change information generated based on a data writing operation in the volatile memory device, reads the address map change information from the volatile memory device and stores the read address map change information in the nonvolatile memory device by using reserved power in case in which abnormal power off occurs, and performs an operation of updating address map information based on the address map change information stored in the nonvolatile memory device. An embodiment may also include wherein when a voltage of a power source applied to the storage device is dropped to below a threshold voltage in a state in which power off control signal is not generated, the processor determines that abnormal power off has occurred. An embodiment may also include further comprising: a power supply device supplying reserved power to the storage device when abnormal power off occurs. An embodiment may also include wherein the power supply device comprises: a reserved power charging unit charging supplied power to a charging element; and a power distribution unit supplying power charged in the reserved power charging unit to the storage device when abnormal power off occurs. An embodiment may also include wherein when abnormal power off occurs, the power distribution unit supplies power charged in the reserved power charging unit to the processor, the volatile memory device, and the nonvolatile memory device constituting the storage device. An embodiment may also include wherein the reserved power charging unit further comprises: a circuit for charging a counter electromotive force generated from a motor rotating by inertia in a state in which abnormal power off occurs to the charging element. An embodiment may also include wherein when the storage device is initialized, the processor stores address map information stored in the storage medium to the volatile memory device, and update the address map information stored in the volatile memory device based on a write operation. An embodiment may also include wherein when the address map change information is stored in a full state in an initially set address map change information list, the processor reads the address map information stored in the volatile memory device and writes the read address map information to the storage medium. An embodiment may also include wherein the address map information is written to the storage medium. An embodiment may also include wherein the processor reads the address map information stored in the volatile memory device, writes the read address map information to the storage medium, and then, deletes the address map change information stored in the volatile memory device. An embodiment may also include wherein the address map information includes information for converting a logical block address into a physical address of the storage medium by using a virtual address. An embodiment may also include wherein the address map information includes information for converting a logical block address designated by a command into a physical address of the storage medium such that it is sequentially written in any one of an inner circumferential direction and an outer circumferential direction in a virtual band corresponding to a physical area of the storage medium. An embodiment may also include wherein the address map information includes mapping information between a logical band classified as an aggregate of logical block addresses and a virtual band corresponding to a physical area of the storage medium and mapping information between a logical block address in a virtual band allocated to a logical band and a virtual address corresponding to a sector. An embodiment may also include wherein the processor controls the storage medium interface to write data and a logical block address corresponding thereto to the storage medium when the data write operation is executed. An embodiment may also include wherein a data storage area and a logical block address storage area are allocated in units of sectors to the storage medium. An embodiment may also include wherein the address map change information includes information regarding a position of data written in the storage medium without being reflected in the address map information. An embodiment may also include wherein the address map change information includes a logical band number with respect to data written in the storage medium without being reflected in the address map information, a virtual band number allocated to the logical band, and a finally accessed virtual address in the virtual band allocated to the logical band.

An embodiment may also include wherein the processor performs an address map information updating process of accessing a first area of the storage medium written without being reflected in the address map information by using the address map change information read from the nonvolatile memory device when power is applied to the storage device, and adding virtual address mapping information corresponding to a logical block address read from the first area to the address map information. An embodiment may also include wherein the processor determines the first area based on a difference between a finally accessed virtual address in a virtual band included in the address map change information and a finally accessed virtual address in a virtual band included in the address map information. An embodiment may also include wherein the processor includes an area of the storage medium corresponding to a section starting from a start virtual address with respect to a virtual band of a newly allocated virtual band number based on the address map change information to a finally accessed virtual address in the virtual band number included in the address map change information, in the first area. An embodiment may also include wherein, regarding a virtual band included in the address map change information to which the virtual band number is not newly allocated, the processor includes an area of the storage medium corresponding to a section starting from an immediately next virtual address of the finally accessed virtual address read from the address map information to the finally accessed virtual address read from the address map change information, in the first area.

An embodiment may also include wherein the processor executes an address map information updating process of newly allocating a virtual band number not present in the address map information among virtual band numbers included in the address map change information to the address map information based on the address map change information. An embodiment may also include wherein the processor performs processing of deleting the address map change information stored in the nonvolatile memory after performing the operation of updating the address map information. An embodiment may also include wherein the storage device includes a disk drive.

An embodiment may also be a computer system comprising: a host device issuing a command for operating a connected storage device; and a storage device for writing data transmitted from the host device in a storage medium or reading data from the storage medium and transmitting the data to the host device based on the command issued from the host device, wherein when supplied power is abnormally cut off, the storage device stores generated address map change information based on a data write operation in a nonvolatile memory device by using reserved power, and updates address map information with respect to the storage device based on the address map change information stored in the nonvolatile memory device. An embodiment may also include wherein the storage device writes data and a logical block address corresponding thereto in a storage medium when a data write operation is executed. An embodiment may also include wherein the address map change information includes information regarding a position of data written in a storage medium of the storage device without being reflected on the address map information. An embodiment may also include wherein, when power is applied, the storage device executes an address map information updating process of accessing a first area of the storage medium written without being reflected on the address map information by using the address map change information read from the nonvolatile memory device and adding virtual address mapping information corresponding to a logical block address read from the first area to the address map information.

Another embodiment may be a method for managing address map information through a network, the method comprising: downloading a program for managing address map information with respect to a storage device from a terminal connected to the network; and executing the downloaded program for managing address map information with respect to the storage device, wherein the program for managing address map information with respect to the storage device includes a program code for performing a process of storing address map change information generated in the storage device to a nonvolatile memory device when power is abnormally cut off, and a process of updating address map information with respect to the storage device based on the address map change information stored in the nonvolatile memory device when power is applied to the storage device.

Another embodiment may be a computer-readable storage medium storing a program code for executing a method described herein in a computer.

The present invention can be applicable to storage devices using various write methods as well as to a disk drive using the shingled write method.

The present invention can be realized as a method, an apparatus, a system and so on. When the present invention is realized as software, the members of the present invention are code segments which execute necessary operations. Programs or code segments may be stored in a processor readable medium. The processor readable medium may be any medium which can store or transmit information, such as an electronic circuit, a semiconductor memory device, a ROM, a flash memory, an EROM (Erasable ROM), a floppy disc, an optical disc, a hard disc, or the like.

Although the invention has been described with reference to particular embodiments, it will be apparent to one of ordinary skill in the art that modifications to the described embodiments may be made without departing from the spirit and scope of the invention. Therefore, it is obvious that the present invention is not restricted to the specific structures or arrangements shown or described in this specification.

DESCRIPTION OF REFERENCE NUMERALS IN THE DRAWINGS

FIG. 1
2000: host device
160: host I/F
110: processor
140: storage medium I/F
170: nonvolatile memory device
180: power supply device
150: storage medium
FIG. 4
410: pre-amplifier
420: R/W channel
480: host interface
440: VCM driving unit
450: SPM driving unit
500: power supply device
430: processor
490: nonvolatile memory device
FIG. 11
310: power supply unit
320: reserved power charging unit
330: power distribution unit
FIG. 12
선위분배부 : power distribution unit
FIG. 13
전원분배부 : power distribution unit
FIG. 14
430; processor
430-1: power control processor
430-2: address map information management processor
430-3: address conversion processor
470-2: address map change information
470-1: address map information (meta data)
FIG. 15
430-3A: first processor
430-3B: second processor
430-3C: third processor
주소사상정보: address map information
저장매체: storage medium
FIG. 16
133: garbage queue
132: allocation queue
131: free queue
FIG. 17
S101: abnormal power off occurs?
S102: store address map change information in nonvolatile memory device
S103: update address map information based on address map change information stored in nonvolatile memory device
FIG. 18
S201: power on mode?
S202: monitor power source voltage
S204: determine abnormal power off
FIG. 19
S302: store address map information in RAM
S303: address map change information is stored in nonvolatile memory device?
S304: store address map change information in RAM
S305: reconfigure address map information
S306: store reconfigured address map information in storage medium or nonvolatile memory device
S307: delete address map change information
FIG. 20
S401: reconfigure virtual band (VB) mapped to logical band (LV)
S402: reconfigure VA mapping information corresponding to LBA
FIG. 21
S501: calculate data storage area written without being reflected on address map information
S502: read LBA from calculated data storage area
S503: add VA mapping information corresponding to read LBA to address map information FIG. 22
S601: write data and LBA in storage medium based on write command
S602: generate address map change information
S604: abnormal power off occurs?
S605: store address map change information in nonvolatile memory device
S606: update address map information based on address map change information stored in nonvolatile memory device FIG. 23
S701: determine LB corresponding to LBA designated by write command
S702: allocated VB exists in determined LB?
S703: allocation-available VA exists in allocated VB?
S704: allocate new VB based on physical zone
S705: allocate VA to LBA
S706: convert VA into CHS information
S707: execute access based on CHS information
S708: write data and LBA FIG. 24
S801: address map change information list is full?
S802: store address map information
S803: delete address map change information FIG. 40
510: program providing terminal
520: network
530: host device PC
540: storage device FIG. 41
S901: access program providing terminal
S902: request program for managing address map information
S903: download program for managing address map information
S904: execute program for managing address map information

What is claimed is:

1. An apparatus comprising:
a first nonvolatile data storage medium;
a second nonvolatile data storage medium having a faster access time than the first nonvolatile data storage medium;
a third data storage medium;
a processor configured to:
store address map information for the first nonvolatile data storage medium to the first nonvolatile data storage medium, the address map information including:
mapping information between a logical band classified as a range of logical block addresses, and a virtual band corresponding to a physical area of the first nonvolatile data storage medium
mapping information between a logical block address within the range of logical block addresses of the logical band, and a virtual address within the virtual band allocated to the logical band;
store address map change data for the first nonvolatile data storage medium to the third data storage medium, the address map change data including:
changes to the address map information since the address map information was last stored to the first nonvolatile data storage medium;
a logical band number, a virtual band number allocated to the logical band, and a last virtual address in a consecutive sequence of occupied virtual addresses in the virtual band allocated to the logical band;
store the address map change data to the second nonvolatile data storage medium when an abnormal power state is detected;
when the power state is no longer abnormal:
retrieve the address map information that was last saved to the first nonvolatile data storage medium;
retrieve the address map change data from the second nonvolatile data storage medium; and
update the address map information using the address map change data.

2. The apparatus of claim 1, further comprising:
a power supply device including:
a power supply unit configured to supply power in a normal power state;
a reserved power charging unit configured to supply stored power in the abnormal power state; and
a power distribution unit configured to supply power to the apparatus from the power supply unit or the reserved power unit based on input from the processor.

3. The apparatus of claim 2, wherein the processor is further configured to send a first control signal to the power supply device to indicate the normal power state, and to send a second control signal to the power supply device to indicate the abnormal power state.

4. The apparatus of claim 3, wherein the normal power state is defined by the power supply device supplying electricity at or above a threshold power level, and the abnormal power state is defined by the power supply device supplying electricity below the threshold power level.

5. The apparatus of claim 2, wherein the reserved power charging unit stores power from the power supply unit based on a first signal from the processor, the first signal indicating the normal power state, and supplies power to the power distribution unit from stored power based on a second signal from the processor, the second signal indicating the abnormal power state.

6. The apparatus of claim 5, wherein the first nonvolatile data storage medium is a disc data storage medium, and wherein the reserved power charging unit is further configured to receive power generated by counter electromotive force created by inertia of the disc data storage medium based on a processor signal indicating the abnormal power state.

7. The apparatus of claim 6, wherein the address map information includes information for converting a logical block address received from a host device into a physical address of the disc data storage medium; and
wherein data corresponding to the logical block addresses are written to sequential physical addresses in a shingled manner such that writing of a first track overlaps at least a portion of a second track.

8. The apparatus of claim 1, wherein the address map information includes logical band identifiers, virtual band identifiers, a last occupied virtual address in each virtual band, and for each virtual band a starting logical block address in a sequence of logical block addresses, a starting virtual address corresponding to the starting logical block address, and a number of sequential virtual addresses written corresponding to the number of logical block addresses in the sequence of logical block addresses.

9. The apparatus of claim 8, wherein the processor is further configured to update the address map information by using the address map change data to determine written virtual addresses that are not reflected in the address map information, reading data stored in the virtual addresses corresponding to the logical block address assigned to each virtual address, and updating the address map information with the read logical block addresses and information from the address map change data.

10. The apparatus of claim 1, wherein each virtual band comprises a set number of virtual addresses and data is written to the virtual addresses in consecutive order, and wherein the processor is further configured to:
receive a write command from a host for a logical block address (LBA);
determine if the logical band including the LBA has an assigned virtual band;
determine if the assigned virtual band has an available virtual address to store the data of the write command;
write the data to the available virtual address and assign the LBA of the write command to the available virtual address when the assigned virtual band has an available virtual address;
allocate a new virtual band from a queue of available virtual bands to the logical band when the logical band has no assigned virtual band or the assigned virtual band has no available virtual address, and write the data to the first virtual address of the new virtual band; and
update the address map change data to reflect the logical band, the virtual band and the virtual address to which the data was written.

11. The apparatus of claim 10, wherein data is always written to a new virtual address, and a previous virtual address is invalidated if the logical block address associated with the previous virtual address is written to a new virtual address, and wherein the processor is further configured to:
determine if the number of virtual bands in the queue of available virtual bands is below a first threshold;
when the number of virtual bands in the queue of available virtual bands is below the first threshold, determine if the number of invalidated virtual addresses in an old virtual band exceeds a second threshold value;
when the number of invalidated virtual addresses exceeds the second threshold value, move the old virtual band to a garbage queue;
move data in the valid virtual addresses of the old virtual band to available virtual addresses of a newly allocated virtual band when the old virtual band is assigned to the same logical band as the newly allocated virtual band; and
move the old virtual band to the queue of available virtual bands.

12. The apparatus of claim 1, wherein the address map change data comprises a list of memory addresses of data write commands received from a host.

13. The apparatus of claim 12, wherein the processor is further configured to:
load the address map information from the first nonvolatile data storage medium to the third data storage medium;
update the address map information stored in the third data storage medium when a write operation is performed; and
save the updated address map information to the first nonvolatile data storage medium when the address map change data exceeds a threshold size.

14. The apparatus of claim 13, wherein the threshold size is determined by a list size that can be saved to the second nonvolatile data storage medium.

15. The apparatus of claim 1 further comprising a network interface, and wherein the apparatus is configured to retrieve a set of instructions over the network interface that, when executed by the apparatus, control the operation of the processor.

16. An apparatus comprising:
a memory device storing instructions that, when executed by a processor, cause the processor to perform the method comprising:
monitoring for abnormal power events in a data storage device;
storing address mapping information to a first nonvolatile data storage medium, the address mapping information including:
mapping information between a logical band classified as a range of logical block addresses and a virtual band corresponding to a physical area of the first nonvolatile data storage medium; and
mapping information between a logical block address within the range of logical block addresses of the logical band and a virtual address within the virtual band allocated to the logical band;
when an abnormal power event is detected, storing changes to address mapping to a second nonvolatile data storage medium based on the second nonvolatile data store medium having a faster access time than the first nonvolatile data storage medium, the changes to the address mapping including a logical band number and a virtual band number allocated to the logical band; and
updating the address mapping information previously stored to the first nonvolatile data storage medium based on the changes to address mapping stored in the second nonvolatile data storage medium when normal power is restored to the data storage device.

17. The apparatus of claim 16, wherein the changes to address mapping include a last virtual address in a consecutive sequence of occupied virtual addresses in the virtual band allocated to the logical band.

18. The apparatus of claim 16, wherein the method further comprises storing data to the first nonvolatile data storage medium using a shingled storage method, the shingled storage method comprising:
writing data to a set of tracks on a disc of the first nonvolatile data storage medium in consecutive order, such that data is written to track N−1 prior to track N, and track N is written prior to track N+1; and
writing data to the set of tracks such that the data of track N−1 is partially overwritten by the data of track N, and the data of track N is partially overwritten by the data of track N+1.

19. A method comprising:
monitoring for abnormal power off in a data storage device;
storing a first instance of an address map for a first nonvolatile data storage medium to the first nonvolatile data storage medium, the address map including:
mapping information between a logical band classified as a range of logical block addresses and a virtual band corresponding to a physical area of the first nonvolatile data storage medium; and
mapping information between a logical block address within the range of logical block addresses of the logical band and a virtual address within the virtual band allocated to the logical band;
when an abnormal power off is detected, storing address map changes to a second nonvolatile data storage medium based on the second nonvolatile data storage medium having a faster access time than the first nonvolatile data storage medium, the address map changes including changes to the address map since the last time the address map was stored to the first nonvolatile data storage medium, including a logical band number and a virtual band number allocated to the logical band; and updating the first instance of the address map saved in the first nonvolatile data storage medium based on the address map changes stored in the second nonvolatile data storage medium when power is applied to the data storage device.

20. The method of claim 19, wherein the address map changes comprise a list of memory addresses involved in data write commands since the last time the first instance of the address map was updated.

21. The method of claim 20, further comprising:

loading the first instance of the address map to a volatile storage device to make a second instance of the address map;

updating the second instance of the address map every time a write operation is performed; and storing the updated address map to the first nonvolatile data storage medium when the address map changes list exceeds a threshold size, thereby updating the first instance of the address map.

22. The method of claim 21, wherein the threshold size is determined by a list size that can be stored in the second nonvolatile data storage medium.

* * * * *